United States Patent
Choi et al.

(10) Patent No.: US 12,349,219 B2
(45) Date of Patent: Jul. 1, 2025

(54) VIRTUAL MULTIPLE LINK OPERATION

(71) Applicant: SAMSUNG ELECTRONICS CO., LTD., Suwon-si (KR)

(72) Inventors: Junsu Choi, Suwon-si (KR); Sunkee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 617 days.

(21) Appl. No.: 17/811,856

(22) Filed: Jul. 11, 2022

(65) Prior Publication Data

US 2023/0120818 A1 Apr. 20, 2023

Related U.S. Application Data

(63) Continuation of application No. PCT/KR2022/008738, filed on Jun. 21, 2022.
(Continued)

(30) Foreign Application Priority Data

May 2, 2022 (KR) .................... 10-2022-0054175

(51) Int. Cl.
*H04W 76/15* (2018.01)
*H04W 84/12* (2009.01)

(52) U.S. Cl.
CPC ............ *H04W 76/15* (2018.02); *H04W 84/12* (2013.01)

(58) Field of Classification Search
CPC .............................. H04W 76/15; H04W 84/12
See application file for complete search history.

(56) References Cited

U.S. PATENT DOCUMENTS 9,565,604 B2   2/2017   Hwang et al.
2021/0014776 A1   1/2021   Patil et al.
(Continued)

FOREIGN PATENT DOCUMENTS

KR   10-2021-0007881 A   1/2021
KR   10-2021-0032292 A   3/2021
(Continued)

OTHER PUBLICATIONS

International Search Report English translation for PCT/KR2022/008738 (corresponds to WO2023068474A1), one page. (Year: 2022).*

(Continued)

*Primary Examiner* — Melvin C Marcelo
(74) *Attorney, Agent, or Firm* — BROADVIEW IP LAW, PC

(57) ABSTRACT

A wireless communication network includes an access point (AP) device, a first non-access-point (non-AP) device, and a second non-AP device. The first non-AP device transmits, to the AP device, a request frame for a virtual multiple link operation between the AP device and the first non-AP device. The first non-AP device receives a response frame from the AP device in response to the request frame. A first wireless link between the AP device and the first non-AP device is set up. A virtual link between the AP device and the first non-AP device is set up. The virtual link includes a second wireless link between the AP device and the second non-AP device and a communication link between the second non-AP device and the first non-AP device. The first non-AP device communicates with the AP device via the first wireless link and the virtual link.

20 Claims, 16 Drawing Sheets

Related U.S. Application Data

(60) Provisional application No. 63/257,045, filed on Oct. 18, 2021.

(56) References Cited

U.S. PATENT DOCUMENTS

| | | |
|---|---|---|
| 2021/0014811 A1 | 1/2021 | Seok et al. |
| 2021/0185607 A1 | 6/2021 | Cariou et al. |
| 2021/0289512 A1* | 9/2021 | Hu |
| 2022/0338251 A1* | 10/2022 | Hwang ................ H04B 7/0452 |
| 2023/0276517 A1* | 8/2023 | Seok .................... H04W 76/15 |
| | | 370/328 |

FOREIGN PATENT DOCUMENTS

| | | |
|---|---|---|
| WO | 2021/002618 A1 | 1/2021 |
| WO | 2021/107685 A1 | 6/2021 |
| WO | 2021/112510 A1 | 6/2021 |

OTHER PUBLICATIONS

International Search Report for PCT/KR2022/008738 by Korean Intellectual Property Office dated Oct. 4, 2022.

\* cited by examiner

VIRTUAL MULTIPLE LINK OPERATION

CROSS-REFERENCE TO RELATED APPLICATIONS

This application is a continuation of International Application No. PCT/KR2022/008738 designating the United States, filed on Jun. 21, 2022, in the Korean Intellectual Property Receiving Office and claiming priority to Korean Patent Application No. 10-2022-0054175, filed on May 2, 2022, in the Korean Intellectual Property Office and U.S. Provisional Application No. 63/257,045, filed on Oct. 18, 2021, in the United States Patent and Trademark Office, the disclosures of which are incorporated by reference herein in their entireties.

TECHNICAL FIELD

Various embodiments of the disclosure relates to wireless communication systems, and more particularly to, for example, but not limited to, virtual multiple link operation.

BACKGROUND

Wireless communication devices are increasingly required to support a variety of delay-sensitive applications or real-time applications such as augmented reality (AR), robotics, artificial intelligence (AI), cloud computing, and unmanned vehicles. To implement extremely low latency and extremely high throughput required by such applications, multi-link operation (MLO) has been suggested in the wireless local area network (WLAN). The WLAN is formed within a limited area such as a home, school, apartment, or office building by WLAN devices. Each WLAN device may have one or more stations (STAs) such as the access point (AP) STA and the non-access-point (non-AP) STA.

The MLO may enable a non-AP multi-link device (MLD) to set up multiple links with an AP MLD. Each of multiple links may enable channel access and frame exchanges between the non-AP MLD and the AP MLD independently, which may reduce latency and increase throughput.

SUMMARY

Space constraints of the recent wireless communication devices such as smartphones leads to proximity of transceivers or antennas for the multiple links, thereby causing an in-device coexistence interference on the multiple links. The in-device coexistence interference prevents the MLD from performing the Simultaneous Transmit and Receive (STR) operation in which the MLD receives a frame simultaneously on a link during transmitting a frame on another link.

To avoid the in-device coexistence interference, the Non-STR (NSTR) operation and the enhanced multi-link with single radio (eMLSR) operation have been suggested. In the NSTR operation, because the STR operation is prohibited, only receiving frames on the multiple links or only transmitting frames on the multiple links may be allowed. In the eMLSR operation, a non-AP MLD can listen to multiple links, but is allowed to transmit or receive to/from other MLD on only one link at a time. Therefore, the extremely low latency may not be still expected from the NSTR operation or the eMLSR operation because the STR operation is prohibited. Accordingly, a technology capable of using the STR MLO may be required for an electronic device having a constraint that cannot use the STR MLO.

Embodiments allow the electronic devices to configure a virtual MLD, reduce or remove the in-device coexistence interference on multiple links, perform the STR in the MLO and provide a differentiated user experience for delay-sensitive applications or real-time applications.

One aspect of the present disclosure provides an electronic device for facilitating wireless communication. The electronic device may comprise a memory and a processor coupled to the memory. The electronic device is configured to cause transmitting a request frame for a virtual multiple link operation between the external electronic device and the electronic device to an external electronic device, receiving a response frame from the external electronic device in response to the request frame, set up a first wireless link between the external electronic device and the electronic device, and setting up a virtual link between the external electronic device and the electronic device. The virtual link includes a second wireless link between the external electronic device and another electronic device and a communication link between the another electronic device and the electronic device. The electronic device is further configured to cause communicating with the external electronic device via the first wireless link and the virtual link.

Another aspect of the present disclosure provides an electronic device for facilitating wireless communication. The electronic device may comprise a memory and a processor coupled to the memory. The electronic device is configured to cause receiving a request frame for a virtual multiple link operation between the another electronic device and an external electronic device from another electronic device, transmitting a response frame to the another electronic device in response to the request frame, setting up a first wireless link between the external electronic device and the electronic device, and serving the another electronic device using the first wireless link in the virtual multiple link operation. The virtual multiple link operation uses a virtual link between the external electronic device and the another electronic device and a second wireless link between the external electronic device and the another electronic device. The virtual link includes the first wireless link between the external electronic device and the electronic device and a communication link between the electronic device and the another electronic device.

Another aspect of the present disclosure provides an electronic device for facilitating wireless communication. The electronic device may comprise a memory and a processor coupled to the memory. The electronic device is configured to cause receiving, from an external electronic device, a request frame for a virtual multiple link operation between the electronic device and the non-electronic device, transmitting a response frame to the external electronic device in response to the request frame, setting up a first wireless link between the electronic device and the external electronic device, setting up a virtual link between the electronic device and the external electronic device, and communicating with the external electronic device via the first wireless link and the virtual link. The virtual link includes a second wireless link between the electronic device and another external electronic device and a communication link between the another external electronic device and the external electronic device.

DETAILED DESCRIPTION

Figure 1:
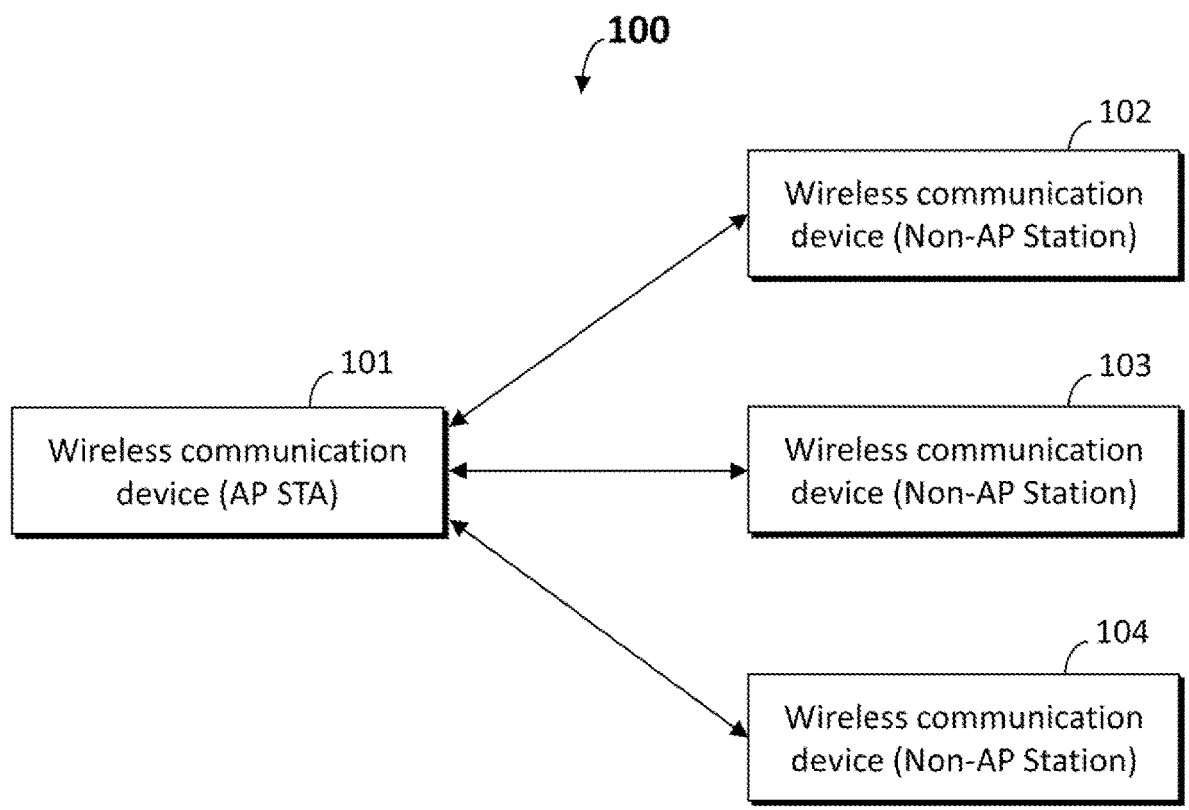
FIG. 1 illustrates a schematic diagram of an example wireless communication network.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive. Like reference numerals designate like elements.

The following description is directed to certain implementations for the purposes of describing the innovative aspects of this disclosure. However, a person having ordinary skill in the art will readily recognize that the teachings herein can be applied in a multitude of different ways. The examples in this disclosure are based on WLAN communication according to the Institute of Electrical and Electronics Engineers (IEEE) 802.11 wireless standards. However, the described implementations may be implemented in any device, system or network that is capable of transmitting and receiving radio frequency (RF) signals according to one or more of the IEEE 802.11 standards, the Bluetooth standard, Global System for Mobile communications (GSM), GSM/ General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

FIG. 1 illustrates a schematic diagram of an example wireless communication network.

Figure 21:
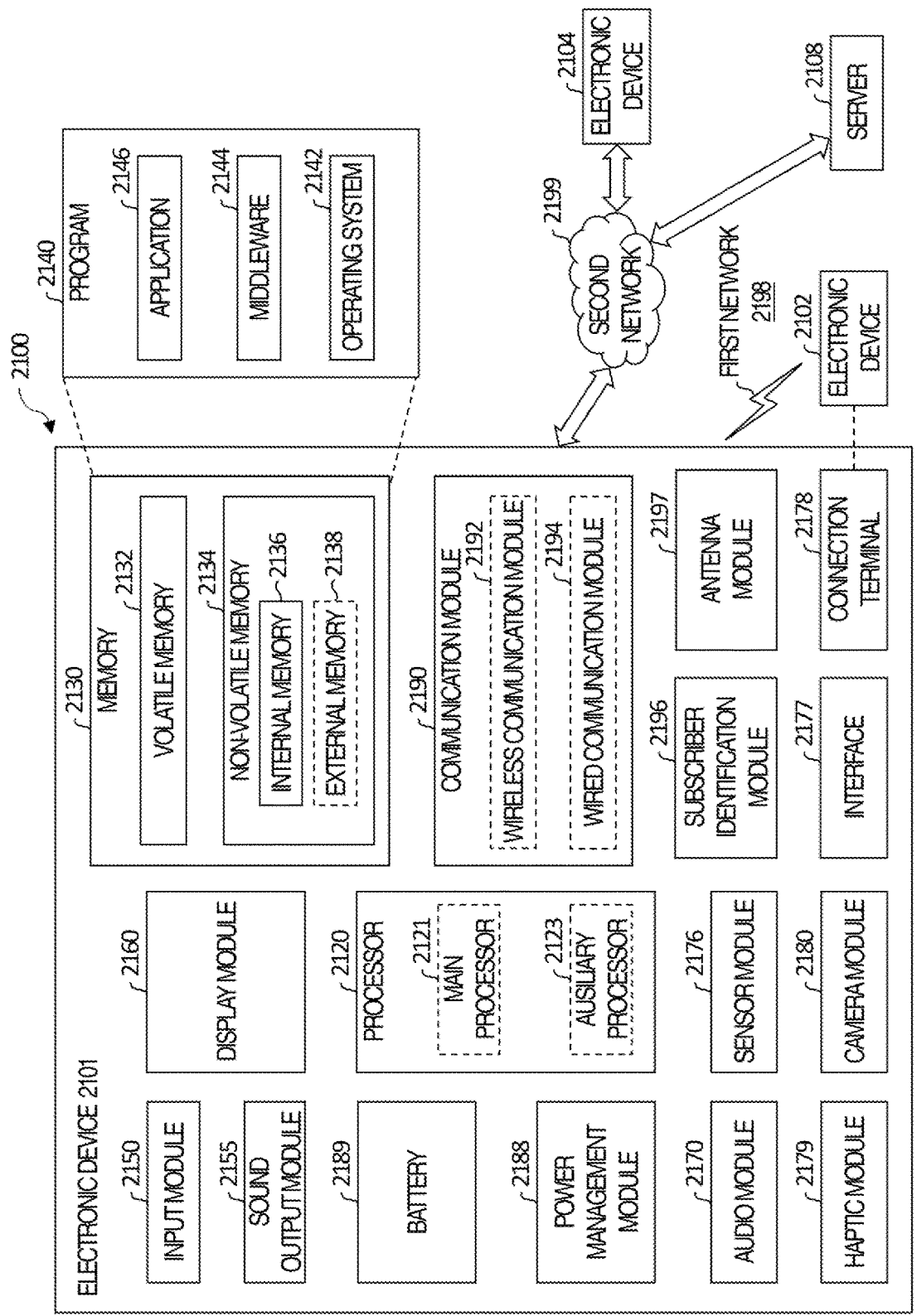
FIG. 21 illustrates an electronic device 2101 in a network environment 2100 according to an embodiment.

Referring to FIG. 1, the example wireless communication network 100 may include a plurality of wireless communication devices 101-104. Each wireless communication device 101-104 may include one or more STAs. The STA may be a logical entity that is a singly addressable instance of a medium access control (MAC) and physical layer (PHY) interface to the wireless medium (WM). The STA may be classified to an access point (AP) STA and a non-AP STA. The AP STA may be an entity that contains one STA and provides access to the distribution system services via the wireless medium for associated STAs. The non-AP STA may be a STA that is not contained within an AP STA. In FIG. 1, assume that the wireless communication device 101 includes an AP STA, and the wireless communication devices 102-104 (e.g., electronic device 2101, 2102, or 2104 as shown in FIG. 21) include a non-AP STA. In some embodiment, the wireless communication device 101 may include a non-AP STA instead of the AP STA.

An AP STA may comprise, be implemented as, or be included in a wireless communication device such as a centralized controller, a base station (BS), a node-B, a base transceiver system (BTS), a site controller, a network adapter, and a router. A non-AP STA may comprise, be implemented as, or be included in a wireless communication device such as a terminal, a wireless transmit/receive unit (WTRU), a user equipment (UE), a mobile station (MS), a mobile terminal, a mobile subscriber unit, a laptop, a smartphone, a battery pack, and a non-mobile computing device. The non-AP STA may an electronic device, and the AP STA may an external electronic device capable of performing wireless or wired communication with the electronic device.

Figure 2:
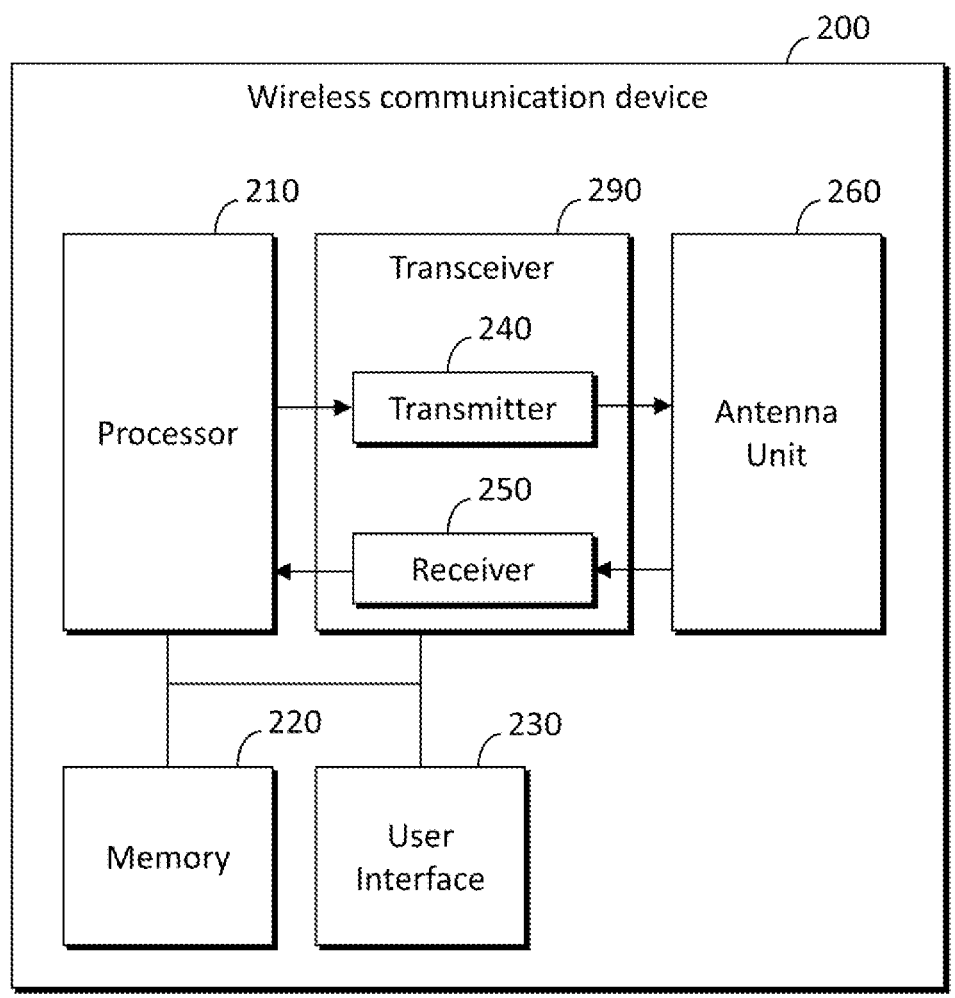
FIG. 2 illustrates a schematic diagram of an example wireless communication device.

FIG. 2 illustrates a schematic diagram of an example wireless communication device. In some embodiments, the example wireless communication device 200 (e.g., electronic device 2101, 2102, or 2104 as shown in FIG. 21) can be an example for any of wireless communication devices 101 to 104 as described with reference to FIG. 1.

The example wireless communication device 200 may include a processor 210 (e.g., as shown processor 2120 in FIG. 21), a memory 220 (e.g., memory 2130 as shown in FIG. 21), a user interface 230, a transmitter 240 (e.g., communication module 2190 as shown in FIG. 21), a receiver 250 (e.g., communication module as shown in FIG. 21), and an antenna unit 260 (e.g., antenna module 2197 as shown in FIG. 21). The transmitter 240 and the receiver 250 can be combined into a transceiver 290 (e.g., communication module 2190 as shown in FIG. 21).

The processor 210 may perform MAC functions, PHY functions, RF functions, or a combination of some or all of the foregoing. In some embodiments, the processor 210 may comprise some or all of a transmitter 240 and a receiver 250. The processor 210 may be coupled to the memory 220 and the user interface 230. The coupling may be direct or indirect. In some embodiments, the processor 210 may include one or more processors.

The memory 220 may be non-transitory computer-readable recording medium storing instructions that, when executed by the processor 210, cause the wireless communication device 200 to perform operations, methods or procedures set forth in the present disclosure. In some embodiments, the memory 220 may store instructions that are needed by one or more of the processor 210, the transmitter 240, the receiver 250, and other components of the wireless communication device 200. The memory may further store an operating system and applications. The memory 220 may comprise, be implemented as, or be included in a read-and-write memory, a read-only memory, a volatile memory, a non-volatile memory, or a combination of some or all of the foregoing.

The user interface 230 may receive information from a user, and output information to the user.

The antenna unit 260 includes one or more physical antennas. When multiple-input multiple-output (MIMO) or multi-user MIMO (MU-MIMO) is used, the antenna unit 260 may include more than one physical antennas.

Figure 3:
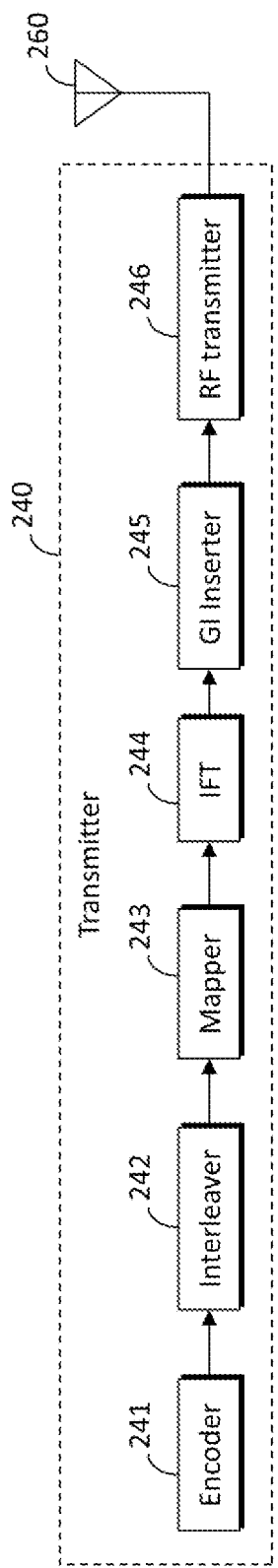
FIG. 3 illustrates a schematic block diagram of an example transmitter.

FIG. 3 illustrates a schematic block diagram of an example transmitter.

The example transmitter 240 may include an encoder 241, an interleaver 242, a mapper 243, an inverse Fourier transformer (IFT) 244, a guard interval (GI) inserter 245, and a RF transmitter 246.

The encoder 241 may encode input data to generate encoded data. For example, the encoder 241 may be a forward error correction (FEC) encoder. The FEC encoder may include or be implemented as a binary convolutional code (BCC) encoder, or a low-density parity-check (LDPC) encoder.

The interleaver 242 may interleave bits of encoded data from the encoder 241 to change the order of bits, and outputs interleaved data. In some embodiments, interleaving may be applied when BCC encoding is employed.

The mapper 243 may map interleaved data into constellation points to generate a block of constellation points. If the LDPC encoding is used in the encoder 241, the mapper 243 may further perform LDPC tone mapping instead of the constellation mapping.

The IFT 244 may convert the block of constellation points into a time domain block corresponding to a symbol by using an inverse discrete Fourier transform (IDFT) or an inverse fast Fourier transform (IFFT).

The GI inserter 245 may prepend a GI to the symbol.

The RF transmitter 246 may convert the symbols into an RF signal and may transmit the RF signal via the antenna unit 260.

Figure 4:
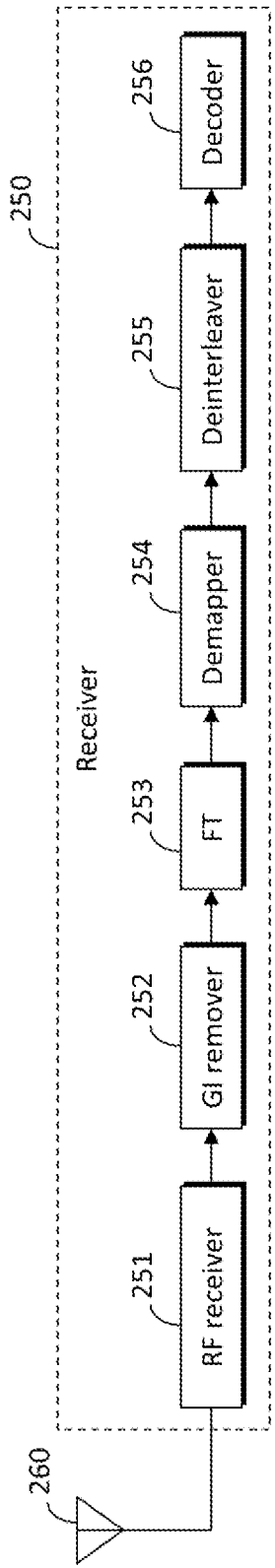
FIG. 4 illustrates a schematic block diagram of an example receiver.

FIG. 4 illustrates a schematic block diagram of an example receiver.

The example receiver 250 may include a RF receiver 251, a GI remover 252, a Fourier transformer (FT) 253, a demapper 254, a deinterleaver 255, and a decoder 256.

The RF receiver 251 may receive an RF signal via the antenna unit 260 and converts the RF signal into one or more symbols.

The GI remover 252 may remove the GI from the symbol.

The FT 253 may convert the symbol corresponding a time domain block into a block of constellation points by using a discrete Fourier transform (DFT) or a fast Fourier transform (FFT) depending on implementation.

The demapper 254 may demap the block of constellation points to demapped data bits. If the LDPC encoding is used, the demapper 254 may further perform LDPC tone demapping before the constellation demapping.

The deinterleaver 255 may deinterleave demapped data bits to generate deinterleaved data bits. In some embodiments, deinterleaving may be applied when BCC encoding is used.

The decoder 256 may decode the deinterleaved data bits. For example, the decoder 256 may be an FEC decoder. The FEC decoder may include a BCC decoder or an LDPC decoder.

Hereinafter, the wireless communication network 100 according to some embodiments will be described with reference to FIGS. 5 through 7. In some embodiments, the example wireless communication device 200 as described with reference to FIG. 2 can be an example for AP MLD (400), wireless communication device D1, or wireless communication device D2 as described with reference to FIG. 5 to FIG. 7.

Figure 5:
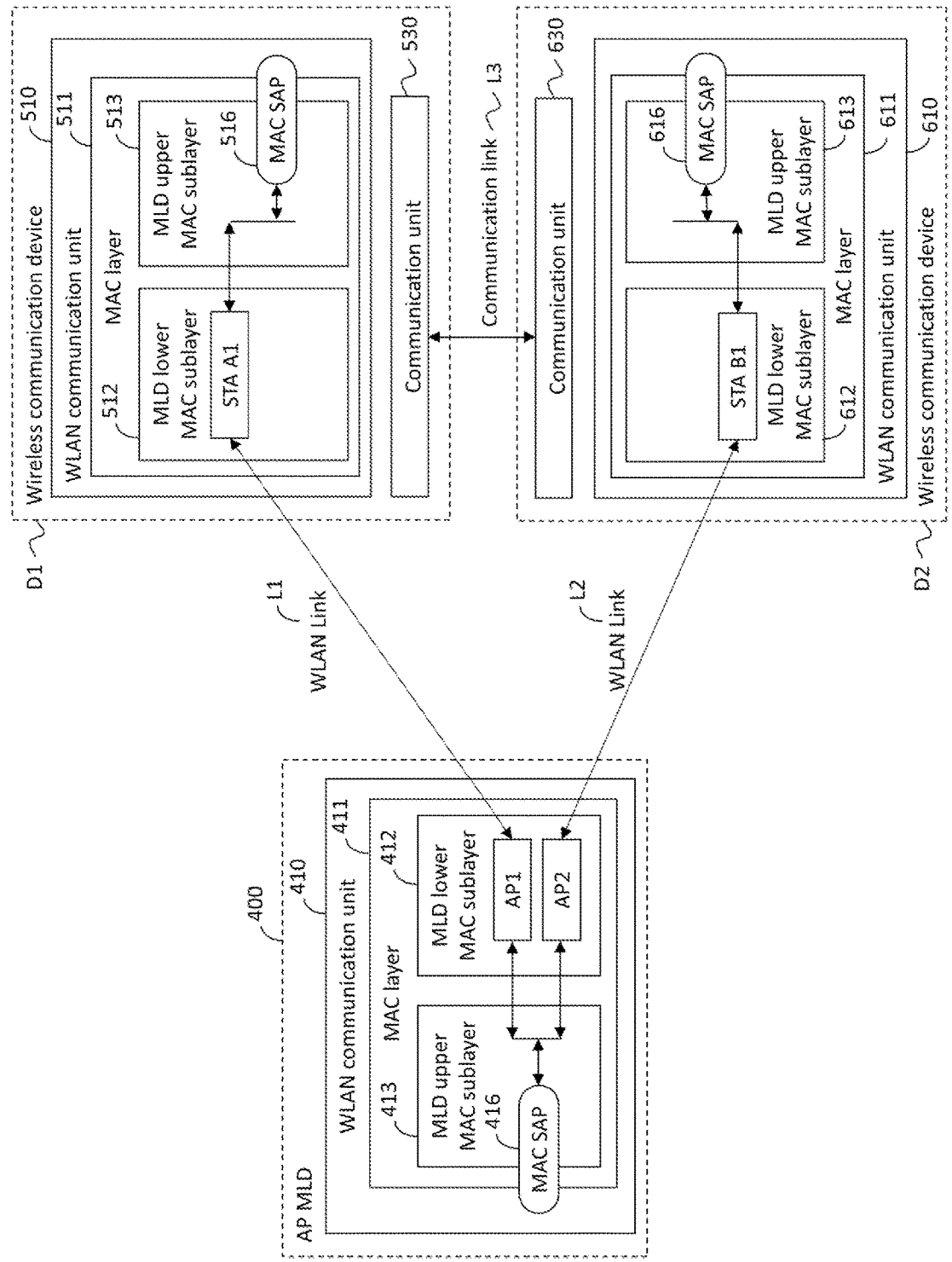
FIG. 5 illustrates a schematic block diagram of a first example wireless communication network.

FIG. 5 illustrates a schematic block diagram of a first example wireless communication network.

Referring to FIG. 5, the example wireless communication network may comprise an AP MLD 400, a wireless communication device D1 (e.g., electronic device 2101, 2102, or 2104 as shown in FIG. 21), and a wireless communication device D2. (e.g., electronic device 2101, 2102, or 2104 as shown in FIG. 21)

The AP MLD 400, the wireless communication device D1, and the wireless communication device D2 may be separate devices from each other except that they can perform wired or wireless communication with each other.

The AP MLD 400 may support multiple links. Each link may be mapped to a channel and a band. In some embodiments, one link may be mapped to one of a 2.4 GHz frequency band, a 5 GHz frequency band, a 6 GHz frequency band, or a 60 GHz frequency band and another link may be mapped to another frequency band (e.g., a frequency band other than the frequency band mapped to the one link). In some embodiments, one link may be mapped to a 20 MHz channel and a 2.4 GHz band, and another link may be mapped to a 40 MHz channel and a 5 GHz band.

In some embodiments, the wireless communication device D1 and the wireless communication device D2 may be MLD or non-MLD. In some embodiments, the wireless communication device 400 and the wireless communication device D1 may be a non-AP WLAN device.

The AP MLD 400 may comprise a WLAN communication unit 410. The WLAN communication unit 410 comprises a MAC layer 411 and a MAC service access point (MAC SAP) 416. The MAC layer 411 comprises a MLD lower MAC sublayer 412 and a MLD upper MAC sublayer 413. The MLD lower MAC sublayer 412 comprises an access point 1 (AP1) and an access point 2 (AP2). In FIG. 5, the AP1 and the AP2 are depicted to be included in the MAC layer 411 for convenience, but they may include some PHY functions as described with reference to FIG. 3 and FIG. 4. In some embodiments, the AP MLD 400 may be non-AP MLD, and the AP1 and the AP2 may be non-AP STAs.

The MLD upper MAC sublayer 413 may have a MLD MAC address, the AP1 may have its MAC address, and the AP2 may have its MAC address. In some embodiments, the MLD MAC address may be used in multi-link setup process set forth hereinafter.

The wireless communication device D1 may comprise a WLAN communication unit 510 and a communication unit 530.

The WLAN communication unit 510 may perform WLAN communication between the wireless communication device D1 and the AP MLD 400, and comprises a MAC layer 511 and a MAC SAP 516. The MAC layer 511 comprises a MLD lower MAC sublayer 512 and a MLD upper MAC sublayer 513. The MLD lower MAC sublayer 512 comprises a STA A1. In FIG. 5, the STA A1 is depicted to be included in the MAC layer 511 for convenience, but may include some PHY functions as described with reference to FIG. 3 and FIG. 4.

The communication unit 530 may perform communication between the wireless communication device D1 and the wireless communication device D2. In some embodiments, the communication unit 530 may comprise, be implemented as, or be included in a Universal Serial Bus (USB) interface chipset, a WLAN chipset, or a WiGig chipset.

The MLD upper MAC sublayer 513 may have a MLD MAC address, and the STA A1 may have its MAC address.

The wireless communication device D2 may comprise a WLAN communication unit 610 and a communication unit 630.

The WLAN communication unit 610 may perform WLAN communication between the wireless communication device D2 and the AP MLD 400, and comprises a MAC layer 611 and a MAC SAP 616. The MAC layer 611 may comprise a MLD lower MAC sublayer 612 and a MLD upper MAC sublayer 613. The MLD lower MAC sublayer 612 may comprise a STA B1. In FIG. 5, the STA B1 is depicted to be included in the MAC layer 611 for convenience, but may include some PHY functions as described with reference to FIG. 3 and FIG. 4.

The communication unit 630 may set up a communication link L3 with the communication unit 530, and may perform communication between the wireless communication device D1 and the wireless communication device D2. In some embodiments, the communication unit 630 may comprise, be implemented as, or be included in a USB interface chipset, a WLAN chipset, or a WiGig chipset.

The MLD upper MAC sublayer 613 may have a MLD MAC address, and the STA B1 may have its MAC address.

In some embodiments, the wireless communication device D1 may be a smartphone and the wireless communication device D2 may be a laptop. In some embodiments, the wireless communication device D1 may be an electronic device such as the smartphone or the laptop, and the wireless communication device D2 may be a device further including a battery pack for charging other electronic devices such as the wireless communication device D1.

Figure 6:
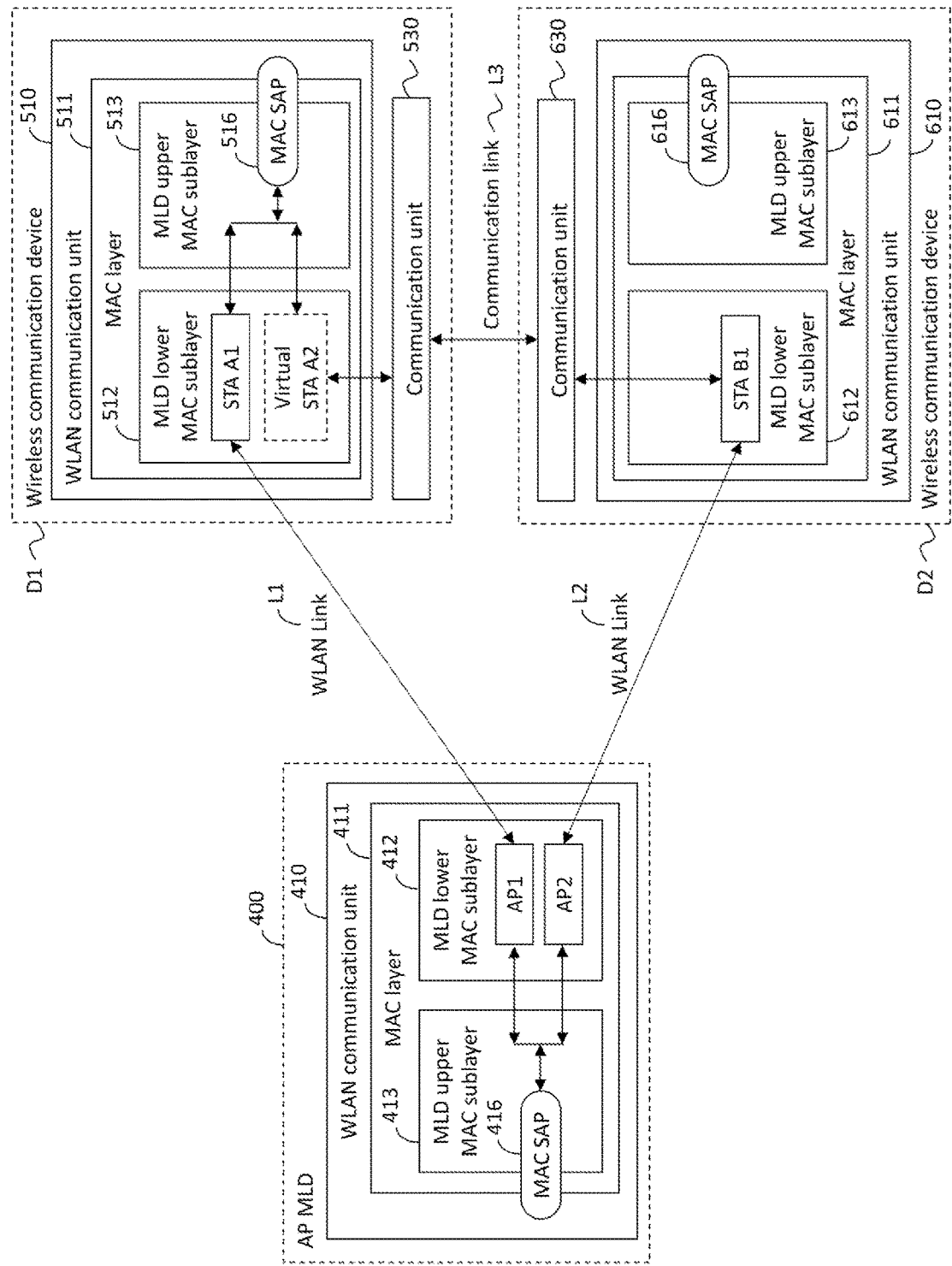
FIG. 6 illustrates a schematic block diagram of a second example wireless communication network.

FIG. 6 illustrates a schematic block diagram of a second example wireless communication network.

Referring to FIG. 6, the wireless communication device D1 may perform the virtual MLO via a first set of virtual multiple WLAN links, and the wireless communication device D2 may serve the wireless communication device D1 in the virtual MLO of the wireless communication device D1 by using the WLAN link L2.

To perform the virtual MLO, the wireless communication device D1 may create the virtual STA A2 that enables the MLD upper MAC sublayer 513 to perceive it as if the STA B1 of the wireless communication device D2 were a station in the MLD lower MAC sublayer 512 of the wireless communication device D1. In FIG. 6, the virtual STA A2 is depicted to be included in the MAC layer 511 for convenience, but may include some PHY functions as described with reference to FIG. 3 and FIG. 4. The wireless communication device D1 may transmit frames to the AP MLD 400 via the first set of virtual multiple WLAN links, and may receive frames from the AP MLD 400 via the first set of virtual multiple WLAN links.

The first set of virtual multiple WLAN links may include a first communication link and a second communication link. The first communication link may be virtually set up by the WLAN link L2 and the communication link L3. The second communication link may be the WLAN link L1.

When the wireless communication device D2 may serve the wireless communication device D1 in the virtual MLO, the STA B1 of the wireless communication device D2 may be coupled to the communication unit 630 rather than to the MAC SAP 616.

As shown in FIG. 6, since the wireless communication device D1 and the wireless communication device D2 in the virtual MLO are separate and distant to each other, it is possible to reduce in-device coexistence interference resulting from proximity of transceivers or antennas for the multiple links. Accordingly, the virtual MLO of the wireless communication device D1 may enable the wireless communication device D1 to perform STR operation without in-device coexistence interference via the virtual multiple WLAN links.

In the embodiment of FIG. 6, the wireless communication device D1 plays a role of performing the virtual MLO, and the wireless communication device D2 plays a role of serving the wireless communication device D1 in the virtual MLO. However, the roles may be switched to each other as described with reference to FIG. 7.

Figure 7:
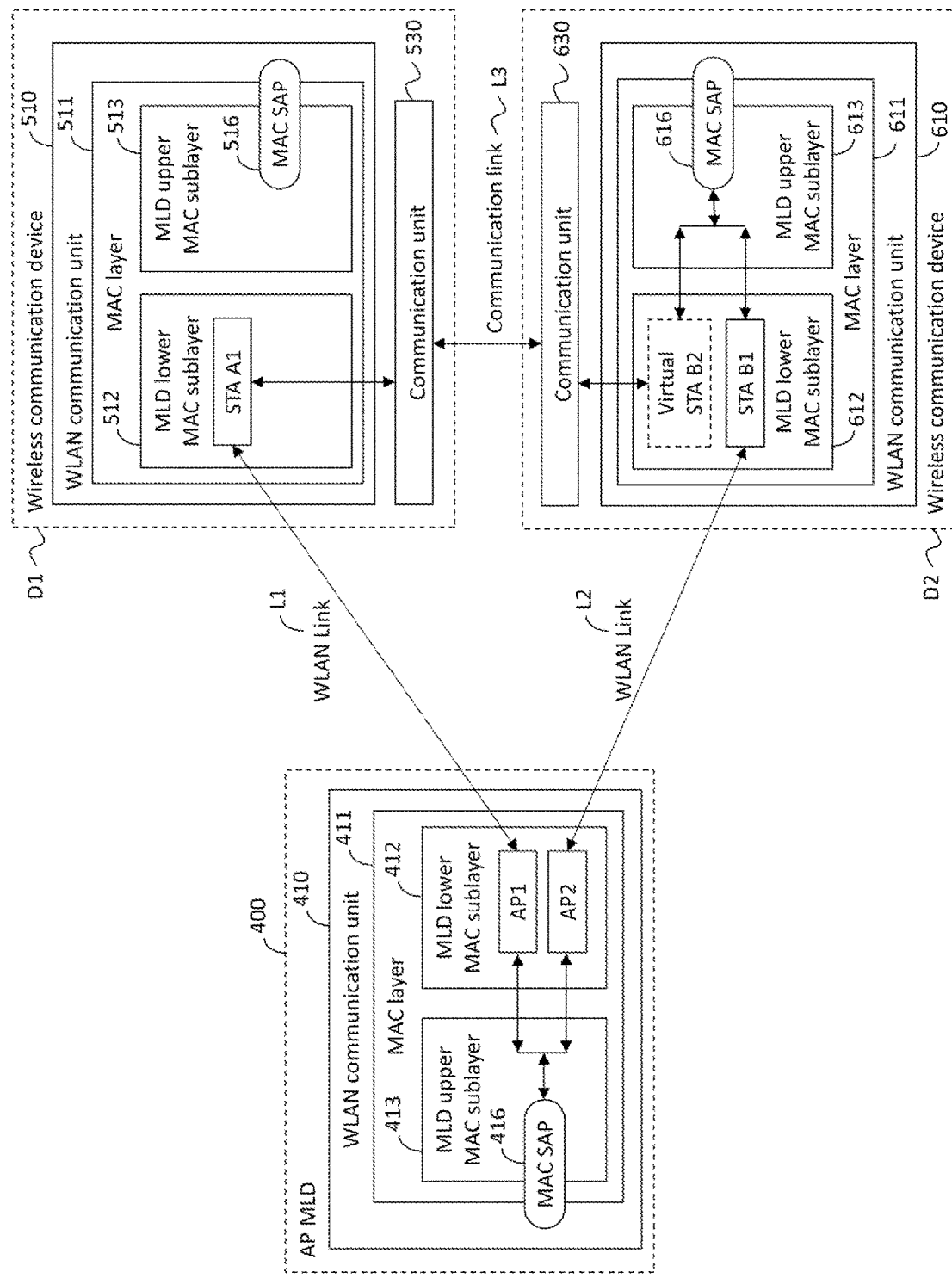
FIG. 7 illustrates a schematic block diagram of a third example wireless communication network.

FIG. 7 illustrates a schematic block diagram of a third example wireless communication network.

Referring to FIG. 7, the wireless communication device D1 may serve the wireless communication device D2 in the virtual MLO, and the wireless communication device D2 may perform the virtual MLO via a second set of virtual multiple WLAN links.

When the wireless communication device D1 serves the wireless communication device D2 in the virtual MLO, the STA A1 of the wireless communication device D1 may be coupled to the communication unit 530 rather than to the MAC SAP 516.

To perform the virtual MLO, the wireless communication device D2 may create the virtual STA B2 that enables the MLD upper MAC sublayer 613 to perceive it as if the STA A1 were a station in the MLD lower MAC sublayer 612 for the wireless communication device D2. In FIG. 7, the virtual STA B2 is depicted to be included in the MAC layer 611 for convenience, but may include some PHY functions as described with reference to FIG. 3 and FIG. 4. The wireless communication device D2 may transmit frames to the AP MLD 400 via the second set of virtual multiple WLAN links, and may receive frames from the AP MLD 400 via the second set of virtual multiple WLAN links.

The second set of virtual multiple WLAN links includes a third communication link and a fourth communication link. The third communication link may be virtually set up by the WLAN link L1 and the communication link L3. The fourth communication link may be the WLAN link L2.

Figure 8:
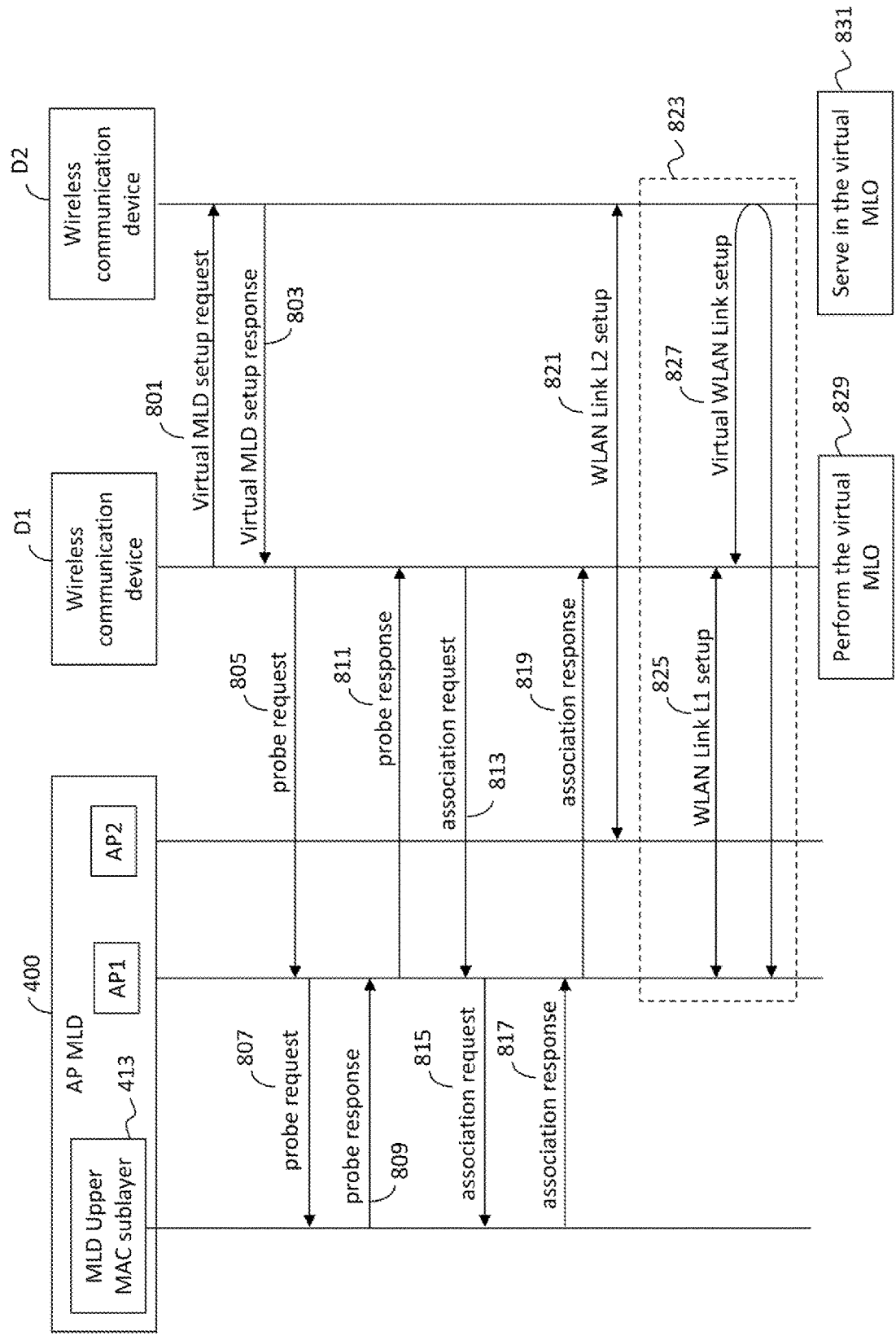
FIG. 8 illustrates an example message flow diagram for setting up virtual multiple links.

FIG. 8 illustrates an example message flow diagram for setting up virtual multiple links.

Operations shown in FIG. 8 may be sequentially performed but are not necessarily sequentially performed. For example, the order of the operations may be changed, or at least two operations may be performed in parallel.

At operation 801, the wireless communication device D1 may transmit a virtual MLD setup request frame to the wireless communication device D2 to request the wireless communication device D2 to enable the wireless communication device D1 to use the STA B1 as a virtual station of the wireless communication device D1. In some embodiments, the MAC layer 511 may transmit the virtual MLD setup request frame to the MAC layer 611 via the communication link L3. In some embodiments, the virtual MLD setup request frame may include either or both of the MLD MAC address of the MLD upper MAC sublayer 513 and the MAC address of the STA A1.

At operation 803, if the wireless communication device D2 permits the wireless communication device D1 to use the STA B1 as a virtual station of the wireless communication device D1, the wireless communication device D2 may transmit a virtual MLD setup response frame to the wireless communication device D1. In some embodiments, the virtual MLD setup response frame may include either or both of the MAC address of the STA B1 and capability information of the wireless communication device D2.

At operation 805, the wireless communication device D1 may transmit a probe request frame to the AP1 of the AP MLD 400 to discover WLAN within proximity of the wireless communication device D1. In some embodiments, the probe request frame may include a multi-link element.

At operation 807, the AP1 may send the probe request to the MLD upper MAC sublayer 413.

At operation 809, the MLD upper MAC sublayer 413 may send a probe response to the AP1. In some embodiments, the probe response may include a multi-link element.

At operation 811, the AP1 may transmit the probe response frame to the wireless communication device D1.

At operation 813, the wireless communication device D1 may transmit an association request frame to the AP1 of the AP MLD 400 if the wireless communication device D1 determines that the STA A1 would like to associate with the AP1. In some embodiments, the association request frame may include a multi-link element.

At operation 815, the AP1 may send the association request to the MLD upper MAC sublayer 413.

At operation 817, the MLD upper MAC sublayer 413 may send an association response to the AP1. In some embodiments, the association response may include a multi-link element.

At operation 819, the AP1 may transmit the association response frame to the wireless communication device D1.

At operation 821, the AP2 and the STA B1 may set up the WLAN link L2 between the AP2 and the STA B 1, and the WLAN link L2 may be used for a virtual WLAN link of the wireless communication device D1.

At operation 823, the AP1 and the STA A1 may set up the first set of virtual multiple WLAN links between the AP1 and the STA A1. More specifically, at operation 825, the AP1 and the STA A1 set up the WLAN link L1 between the AP1 and the STA A1 as part of the first set of virtual multiple WLAN links. At operation 827, as another part of the first set of virtual multiple WLAN links, the AP1 and the STA A1 set up the virtual WLAN link using the WLAN link L2 and the communication link L3.

At operation 829, the wireless communication device D1 may perform the virtual MLO, and may communicate with the AP MLD 400 via the set of virtual multiple WLAN links.

At operation 831, the wireless communication device D2 may serve the wireless communication device D1 in the virtual MLO by using the WLAN link L2.

Hereinafter, the virtual MLO according to some embodiments will be described with reference to FIGS. 9 through 19.

Figure 9:
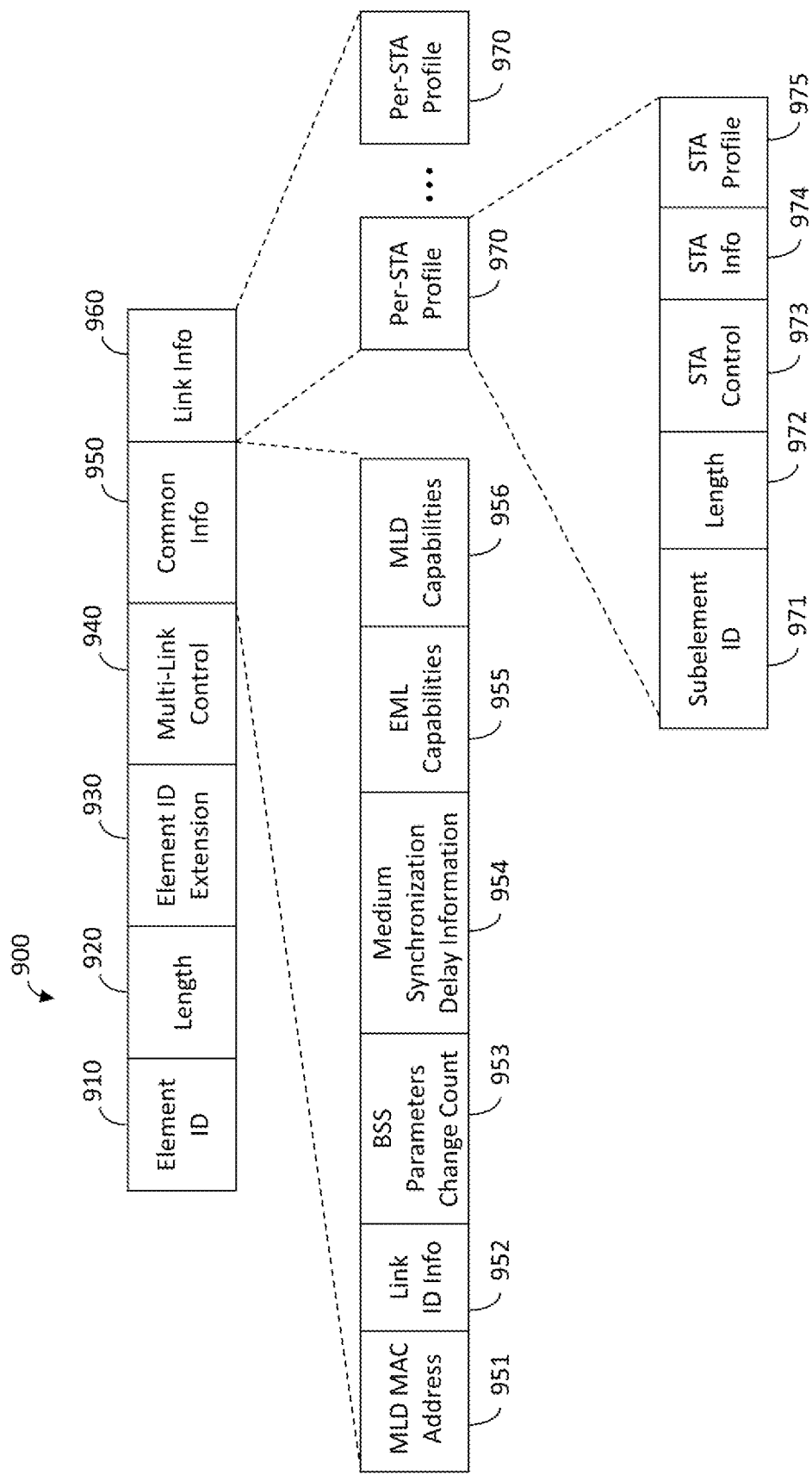
FIG. 9 illustrates an example format of the multi-link element.

FIG. 9 illustrates an example format of the multi-link element.

Referring to FIG. 9, the multi-link element 900 may include an element ID field 910, a length field 920, an element ID extension field 930, a multi-link control field 940, a common info field 950, and a link info field 960.

Generally, the common info field 950 may carry information that are common to all the links. The common info field 950 may include a MLD MAC address field 951, a Link ID info field 952, a BSS Parameters change count field 953, a medium synchronization delay information field 954, an enhanced multi-link (EML) capabilities field 955, and a MLD capabilities field 956.

Generally, the Link Info field 960 may carry information specific to the links. The link info field 960 may include a plurality of per-STA profile fields 970. Each per-STA profile field 970 may include a subelement ID field 971, a length field 972, a STA control field 973, a STA info field 974, and a STA profile field 975.

In some embodiments, the MLD MAC address field 951 of the multi-link element 900 in the probe request frame or the association request frame set forth in FIG. 8 may be set to the MLD MAC address of the MLD upper MAC sublayer 513. In some embodiments, the MLD MAC address field 951 of the multi-link element 900 in the probe response frame or the association response frame set forth in FIG. 8 may be set to the MLD MAC address of the MLD upper MAC sublayer 413.

In some embodiments, the multi-link element 900 in the probe request frame, the probe response frame, the association request frame, or the association response frame set forth in FIG. 8 may include two per-STA profile fields 970. The first per-STA profile field may correspond to the WLAN link L1, and the second per-STA profile field may correspond to the WLAN link L2. The STA Info field 974 in the first per-STA profile field corresponding to the WLAN link L1 may include the MAC address of the STA A1, and the STA Profile field 975 in the first per-STA profile field corresponding to the WLAN link L1 may include capability information of the STA A1. Likewise, the STA Info field 974 in the second per-STA profile field corresponding to the WLAN link L2 may include the MAC address of the STA B1, and the STA Profile field 975 in the second per-STA profile field corresponding to the WLAN link L2 may include capability information of the STA B1.

In some embodiments, the capability information may include some or all of a LDPC coding capability field indicating whether receiving LDPC coded PPDUs is supported, a Supported channel width set field indicating supported channel widths, a Tx STBC field indicating whether transmission of PPDUs using STBC is supported, a RX STBC indicating whether reception of PPDUs using STBC is supported, and a supported modulation and coding scheme (MCS) set field indicating which MCSs are supported.

Figure 10:
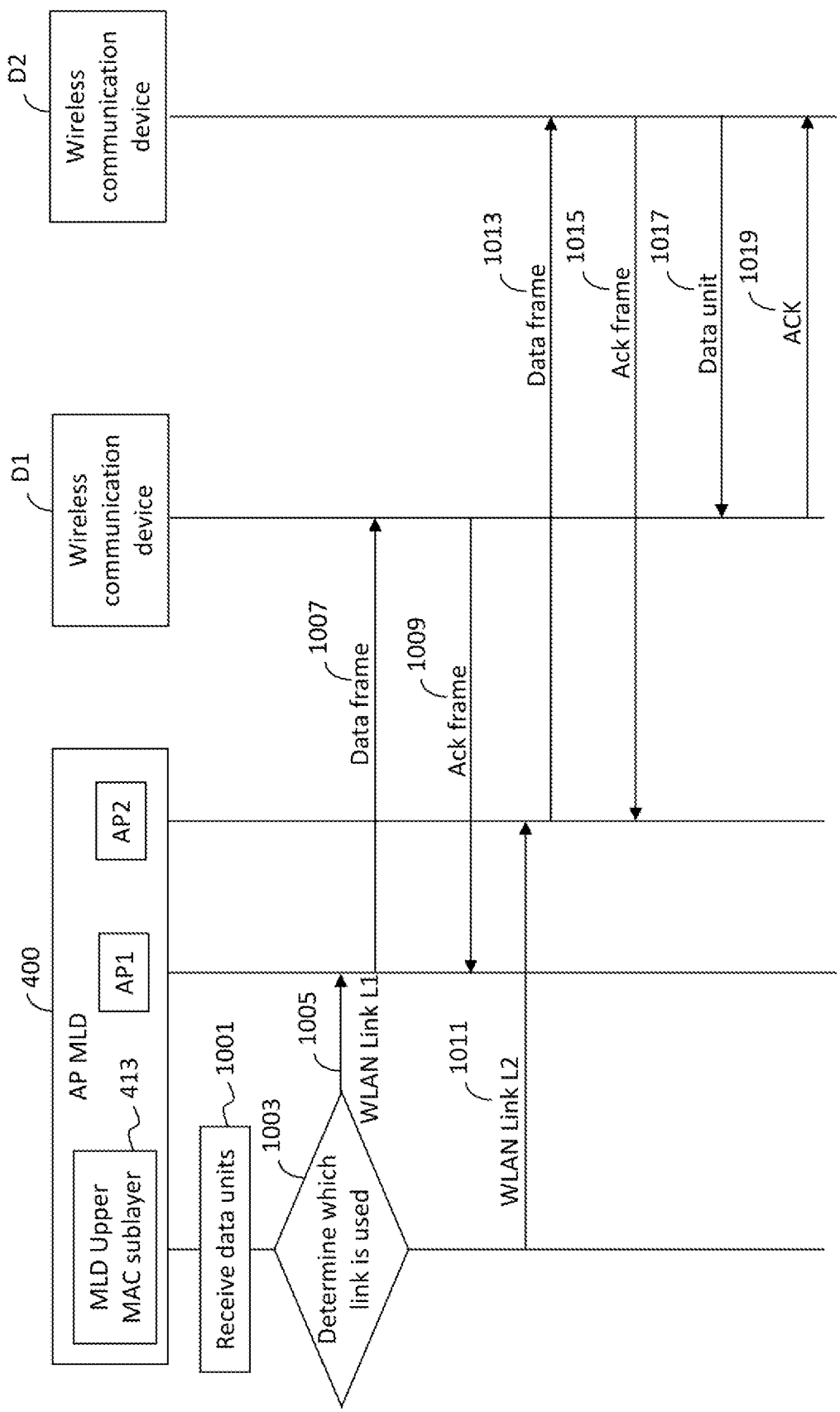
FIG. 10 illustrates an example message flow diagram for the downlink transmission by using virtual multiple links.

FIG. 10 illustrates an example message flow diagram for the downlink transmission using virtual multiple links. In particular, FIG. 10 shows an example message flow diagram in which the wireless communication device D1 receives downlink frames from the AP MLD 400 in the virtual MLO and the wireless communication device D2 serves the wireless communication device D1 for the virtual MLO. Operations shown in FIG. 10 may be sequentially performed but are not necessarily sequentially performed. For example, the order of the operations may be changed, or at least two operations may be performed in parallel.

At operation 1001, the MLD upper MAC sublayer 413 may receive data units from an upper layer (not shown) to be transmitted to the wireless communication device D1.

At operation 1003, the MLD upper MAC sublayer 413 may determine which WLAN link is used to transmit the data units. In some embodiments, the MLD upper MAC sublayer 413 may determine to use a WLAN link for which backoff counter reaches 0 first between the WLAN link L1 and the WLAN link L2. In some embodiments, the MLD upper MAC sublayer 413 may determine to use the WLAN link L1 for transmitting some data units, and determine to use the WLAN link L2 for transmitting the others.

At operation 1005, when the MLD upper MAC sublayer 413 may determine to use the WLAN link L1 for transmitting at least one data unit, the MLD upper MAC sublayer 413 sends the data unit to the AP1.

At operation 1007, the AP1 may transmit a data frame including the data unit to the STA A1 of the wireless communication device D1 through the WLAN link L1 based on the capability information of the STA A1.

At operation 1009, if the STA A1 of the wireless communication device D1 successfully receives the data frame, the STA A1 may transmit an acknowledgment (Ack) frame to the AP1 via the WLAN link L1.

At operation 1011, when the MLD upper MAC sublayer 413 may determine to use the WLAN link L2 for transmitting at least one data unit, the MLD upper MAC sublayer 413 sends the data unit to the AP2.

At operation 1013, the AP2 may transmit a data frame including the data unit to the STA B1 of the wireless communication device D2 through the WLAN link L2, based on the capability information of the STA B1.

At operation 1015, if the STA B1 of the wireless communication device D2 successfully receives the data frame, the STA B1 may transmit an Ack frame to the AP2 via the WLAN link L2.

At operation 1017, the STA B1 may transmit the received data unit to the wireless communication device D1 via the communication link L3, because the data unit is not addressed to the wireless communication device D2 but addressed to the wireless communication device D1.

At operation 1019, if the wireless communication device D1 successfully receives the data unit from the STA B1 via the communication link L3, the wireless communication device D1 may transmit an Ack frame to the STA B1 via the communication link L3.

Figure 11:
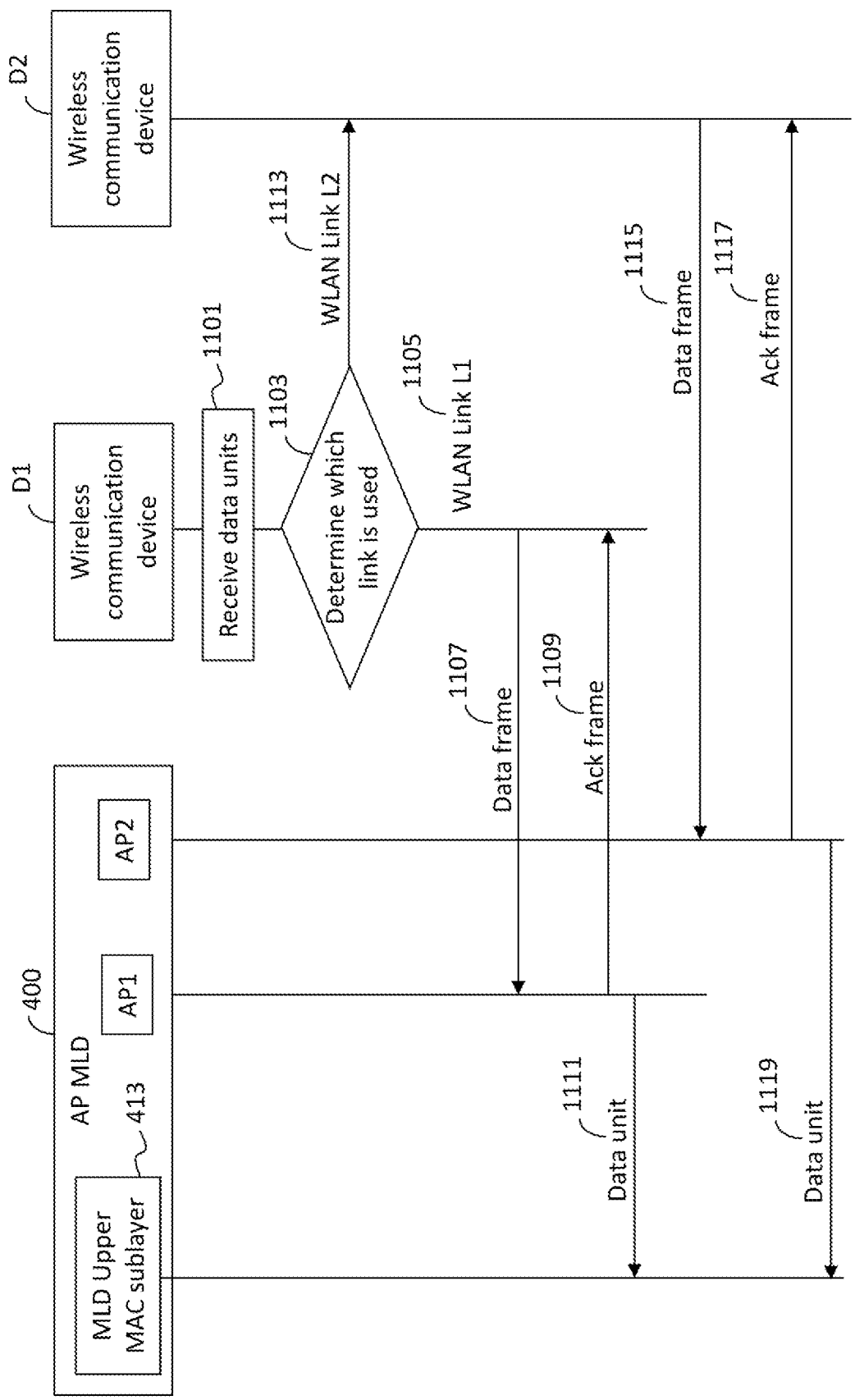
FIG. 11 illustrates an example message flow diagram for the uplink transmission by using virtual multiple links.

FIG. 11 illustrates an example message flow diagram for the uplink transmission by using virtual multiple links. In particular, FIG. 11 shows an example message flow diagram in which the wireless communication device D1 transmits uplink frames to AP MLD 400 in the virtual MLO and the wireless communication device D2 serves the wireless communication device D1 in the virtual MLO.

At operation 1101, the MLD upper MAC sublayer 513 of the wireless communication device D1 may receive data units from an upper layer (not shown) to be transmitted to the AP MLD 400.

At operation 1103, the MLD upper MAC sublayer 513 determines which WLAN link is used to transmit the data units. In some embodiments, the MLD upper MAC sublayer 513 may determine to use a WLAN link for which backoff counter reaches 0 first among the WLAN link L1 and the WLAN link L2. In some embodiments, the MLD upper MAC sublayer 513 may determine to use the WLAN link L1 for transmitting some data units, and determine to use the WLAN link L2 for transmitting the others.

At operation 1105, when the MLD upper MAC sublayer 513 determines to use the WLAN link L1 for transmitting at least one data unit, the MLD upper MAC sublayer 513 may send the data unit to the STA A1.

At operation 1107, the STA A1 may transmit a data frame including the data unit to the AP1 of the AP MLD 400 through the WLAN link L1.

At operation 1109, if the AP1 of the AP MLD 400 successfully receives the data frame, the AP1 may transmit an Ack frame to the STA A1 via the WLAN link L1.

At operation 1111, the AP1 may send the received data unit to the MLD upper MAC sublayer 413.

At operation 1113, when the MLD upper MAC sublayer 513 may determine to use the WLAN link L2 for transmitting at least one data unit, the MLD upper MAC sublayer 513 may send the data unit to the STA B1 of the wireless communication device D2 through the communication link L3.

At operation 1115, the STA B1 may transmit a data frame including the data unit to the AP2 of the AP MLD 400 through the WLAN link L2.

At operation 1117, if the AP2 of the AP MLD 400 successfully receives the data frame, the AP2 may transmit an Ack frame to the STA B1 via the WLAN link L2.

At operation 1119, the AP2 may send the received data unit to the MLD upper MAC sublayer 413.

Figure 12:
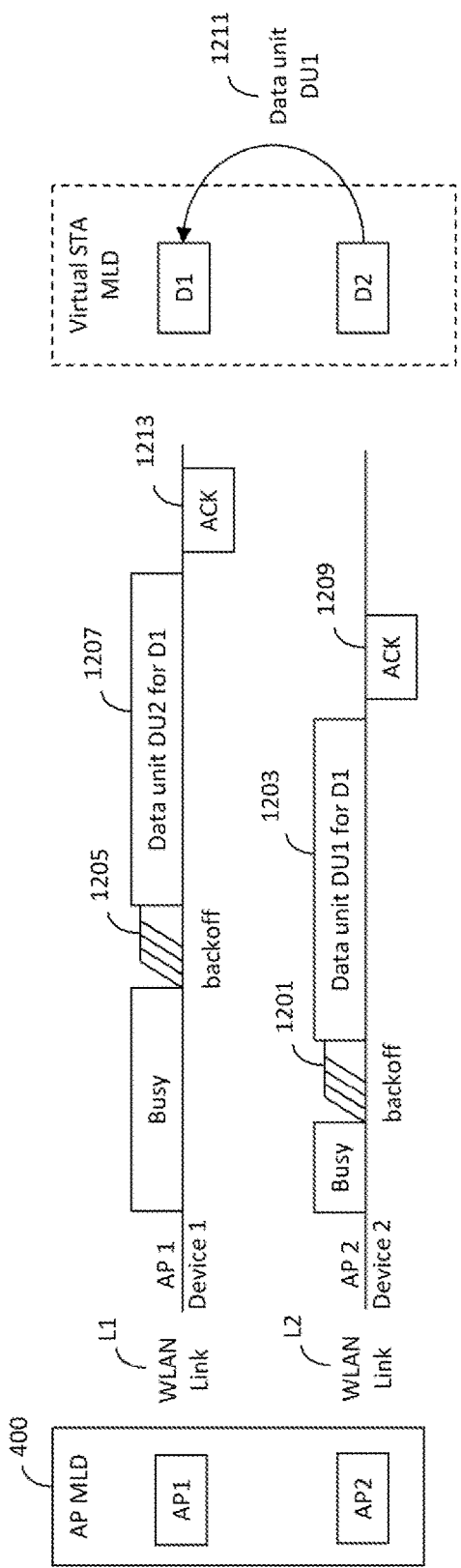
FIG. 12 illustrates a first example downlink data transmission.

FIG. 12 illustrates a first example downlink data transmission.

Operations shown in FIG. 12 may be sequentially performed but are not necessarily sequentially performed. For example, the order of the operations may be changed, or at least two operations may be performed in parallel.

Referring to FIG. 12, the AP MLD 400 may have a buffer containing data units including a data unit DU1 and a data unit DU2 to be transmitted to the wireless communication device D1, and the wireless communication device D1 and the wireless communication device D2 may form a virtual STA MLD using the WLAN link L1 and the WLAN link L2.

The AP MLD 400 may determine which backoff counter (e.g., the backoff counter for which WLAN link) reaches 0 first. When the backoff counter for the WLAN link L2 reaches 0 first at operation 1201, the AP2 may begin to transmit a data frame including the data unit DU1 to the wireless communication device D2 via the WLAN link L2 at operation 1203.

The AP MLD 400 may check whether the backoff counter for the WLAN link L1 reaches 0 during the AP2's transmission of the data unit DU1. When backoff counter for the WLAN link L1 reaches 0 at operation 1205 during the AP2's transmission of the data unit DU1, the AP1 may begin to transmit a data frame including the data unit DU2 to the wireless communication device D1 via the WLAN link L1 at operation 1207.

The AP2's transmission of the data unit DU1 is complete during the AP1's transmission of the data unit DU2. At operation 1209, when the wireless communication device D2 successfully receives the data unit DU1, the wireless communication device D2 may begin to transmit an Ack frame for the data unit DU1 to the AP2 via the WLAN link L2 during reception of the data unit DU2. During operation 1209, the AP MLD 400 and the wireless communication device D1 may perform STR operation for a downlink data frame and an uplink Ack frame.

Because the wireless communication device D2 receives the data unit DU1 for the wireless communication device D1, the wireless communication device D2 may transmit the data unit DU1 to the wireless communication device D1 via the communication link L3 at operation 1211.

At operation 1213, the wireless communication device D1 may transmit an Ack frame for the data unit DU2 after the wireless communication device D1 successfully receives the data unit DU2.

In the embodiment of FIG. 12, the wireless communication device D1 may complete receiving the data unit DU1 via the WLAN link L2 first, and then complete receiving the data unit DU2 via the WLAN link L1.

Figure 13:
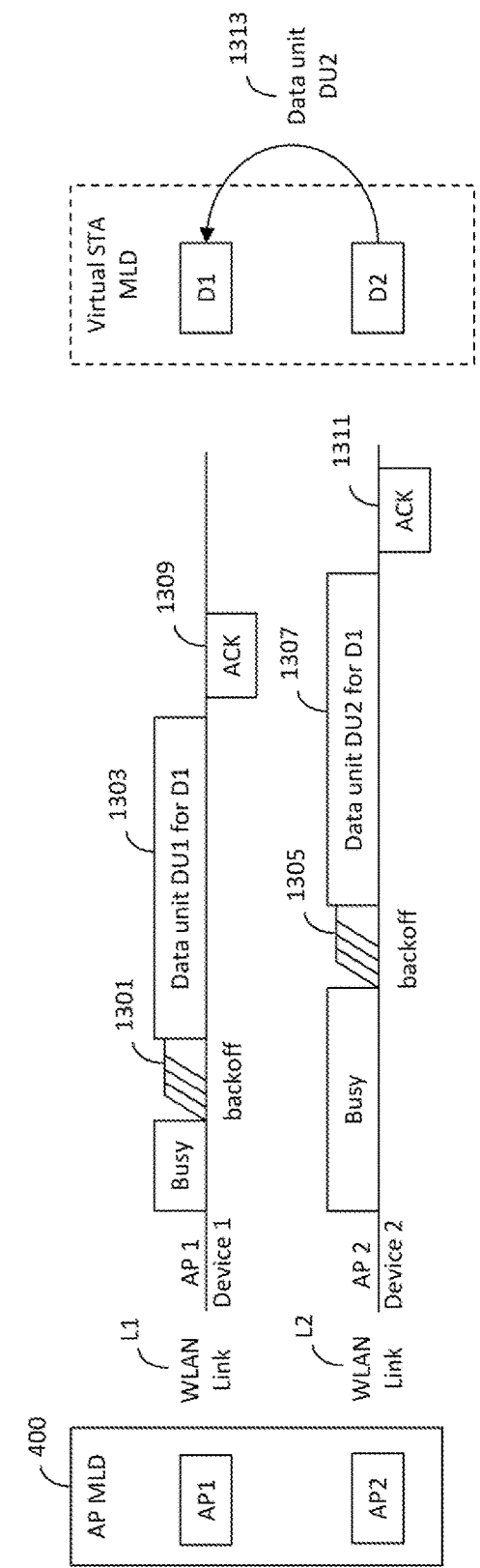
FIG. 13 illustrates a second example downlink data transmission.

FIG. 13 illustrates a second example downlink data transmission.

Operations shown in FIG. 13 may be sequentially performed but are not necessarily sequentially performed. For example, the order of the operations may be changed, or at least two operations may be performed in parallel.

Referring to FIG. 13, the AP MLD 400 may have a buffer containing data units including a data unit DU1 and a data unit DU2 to be transmitted to the wireless communication device D1, and the wireless communication device D1 and the wireless communication device D2 may form a virtual STA MLD using the WLAN link L1 and the WLAN link L2.

The AP MLD 400 may determine which backoff counter (e.g., the backoff counter for which WLAN link) reaches 0 first. When the backoff counter for the WLAN link L1 reaches 0 first at operation 1301, the AP1 may begin to transmit a data frame including the data unit DU1 to the wireless communication device D1 via the WLAN link L1 at operation 1303.

The AP MLD 400 may check whether the backoff counter for the WLAN link L2 reaches 0 during the AP1's transmission of the data unit DU1. When the backoff counter for the WLAN link L2 reaches 0 at operation 1305 during the AP1's transmission of the data unit DU1, the AP2 may begin to transmit a data frame including the data unit DU2 to the wireless communication device D2 via the WLAN link L2 at operation 1307.

The AP1's transmission of the data unit DU1 may be completed during the AP2's transmission of the data unit DU2. At operation 1309, when the wireless communication device D1 successfully receives the data unit DU1, the wireless communication device D1 may begin to transmit an Ack frame for the data unit DU1 to the AP1 via the WLAN link L1 during the D2's reception of the data unit DU2. During operation 1309, the AP MLD 400 and the wireless communication device D1 may perform STR operation for a downlink data frame and an uplink Ack frame.

At operation 1311, the wireless communication device D2 may transmit an Ack frame for the data unit DU2 to the AP2 after the wireless communication device D2 successfully receives the data unit DU2 via the WLAN link L2.

Because the wireless communication device D2 receives the data unit DU2 for the wireless communication device D1, the wireless communication device D2 may transmit the data unit DU2 to the wireless communication device D1 via the communication link L3 at operation 1313.

In the embodiment of FIG. 13, the wireless communication device D1 may complete receiving the data unit DU1 via the WLAN link L1 first, and then complete receiving the data unit DU2 via the WLAN link L2.

Figure 14:
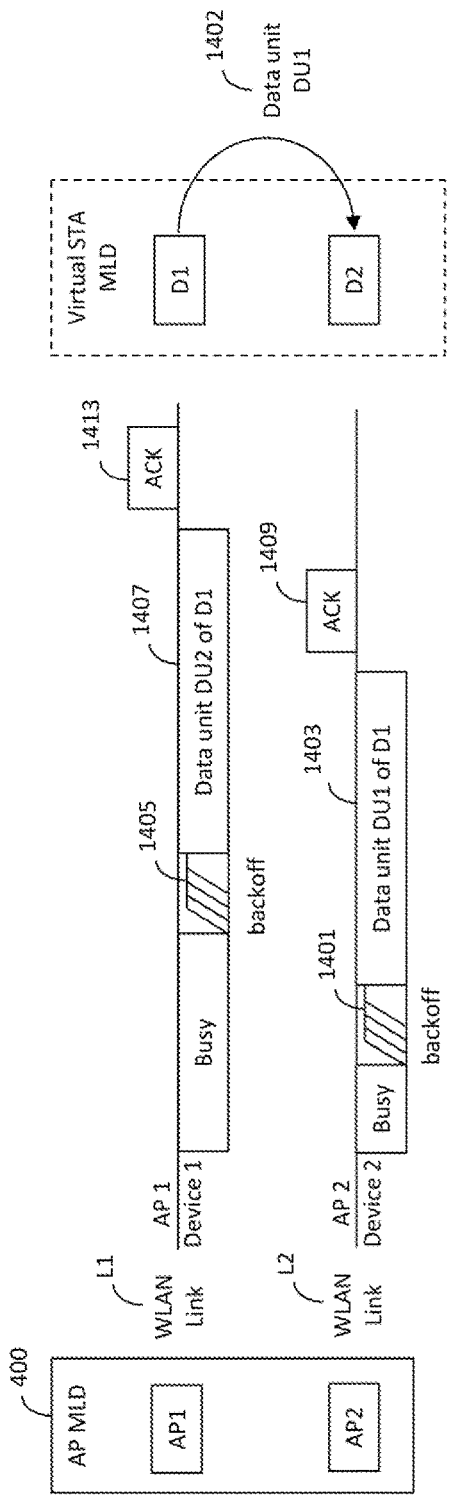
FIG. 14 illustrates a first example uplink data transmission.

FIG. 14 illustrates a first example uplink data transmission.

Operations shown in FIG. 14 may be sequentially performed but are not necessarily sequentially performed. For example, the order of the operations may be changed, or at least two operations may be performed in parallel.

Referring to FIG. 14, the wireless communication device D1 may have a buffer containing data units including a data unit DU1 and a data unit DU2 to be transmitted to the AP MLD 400, and the wireless communication device D1 and the wireless communication device D2 may form a virtual STA MLD using the WLAN link L1 and the WLAN link L2.

The wireless communication device D1 may determine which backoff counter (e.g., the backoff counter for which WLAN link) reaches 0 first. When the backoff counter for the WLAN link L2 reaches 0 first at operation 1401, the wireless communication device D1 may transmit the data unit DU1 to the wireless communication device D2 via the communication link L3 at operation 1402.

The wireless communication device D2 may begin to transmit a data frame including the data unit DU1 to the AP2 via the WLAN link L2 at operation 1403.

The wireless communication device D1 may check whether the backoff counter for the WLAN link L1 reaches 0 during the D2's transmission of the data unit DU1. When the backoff counter for the WLAN link L1 reaches 0 at operation 1405 during the D2's transmission of the data unit DU1, the wireless communication device D1 may begin to transmit a data frame including the data unit DU2 to the AP1 via the WLAN link L1 at operation 1407.

The D2's transmission of the data unit DU1 may be completed during the D1's transmission of the data unit DU2. At operation 1409, when the AP2 successfully receives the data unit DU1, the AP2 may begin to transmit an Ack frame for the data unit DU1 to the wireless communication device D2 via the WLAN link L2 during the AP1's reception of the data unit DU2. During operation 1409, the AP MLD 400 and the wireless communication device D1 may perform STR operation for a downlink Ack frame and an uplink data frame.

At operation 1413, the AP1 may transmit an Ack frame for the data unit DU2 to the D1 after the AP1 successfully receives the data unit DU2.

In the embodiment of FIG. 14, the AP MLD 400 may complete receiving the data unit DU1 via the WLAN link L2 first, and then complete receiving the data unit DU2 via the WLAN link L1.

Figure 15:
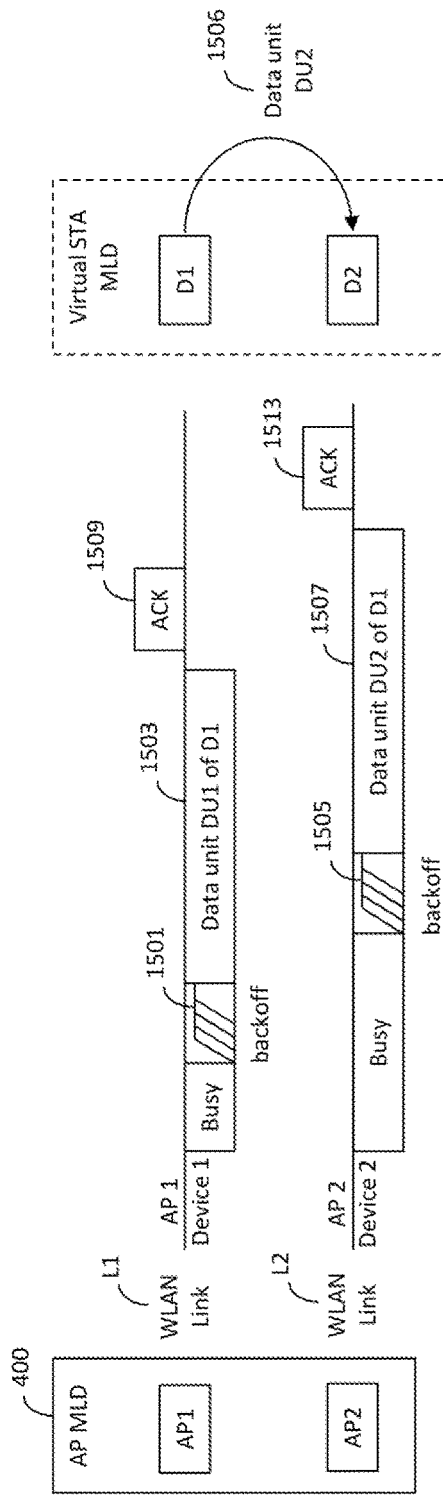
FIG. 15 illustrates a second example uplink data transmission.

FIG. 15 illustrates a second example uplink data transmission.

Operations shown in FIG. 15 may be sequentially performed but are not necessarily sequentially performed. For example, the order of the operations may be changed, or at least two operations may be performed in parallel.

Referring to FIG. 15, the wireless communication device D1 may have a buffer containing data units including a data unit DU1 and a data unit DU2 to be transmitted to the AP MLD 400, and the wireless communication device D1 and the wireless communication device D2 may form a virtual STA MLD using the WLAN link L1 and the WLAN link L2.

The wireless communication device D1 may determine which backoff counter (e.g., the backoff counter for which WLAN link) reaches 0 first. When the backoff counter for the WLAN link L1 reaches 0 first at operation 1501, the wireless communication device D1 may begin to transmit a data frame including the data unit DU1 to the AP1 via the WLAN link L1 at operation 1503.

The wireless communication device D1 may check whether the backoff counter for the WLAN link L2 reaches 0 during the D1's transmission of the data unit DU1. When the backoff counter for the WLAN link L2 reaches 0 at operation 1505 during the D1's transmission of the data unit DU1, the wireless communication device D1 may transmit the data unit DU2 to the wireless communication device D2 via the communication link L3 at operation 1506, and the wireless communication device D2 may begin to transmit a data frame including the data unit DU2 to the AP2 via the WLAN link L2 at operation 1507.

The D1's transmission of the data unit DU1 is completed during the D2's transmission of the data unit DU2. At operation 1509, when the AP1 successfully receive the data unit DU1, the AP1 may begin to transmit an Ack frame for the data unit DU1 to the wireless communication device D1 via the WLAN link L1 during the AP2's reception of the data unit DU2. During operation 1509, the AP MLD 400 and the wireless communication device D1 may perform STR operation for a downlink Ack frame and an uplink data frame.

At operation 1513, the AP2 may transmit an Ack frame for the data unit DU2 after the AP2 successfully receives the data unit DU2.

In the embodiment of FIG. 15, the AP MLD 400 may complete receiving the data unit DU1 via the WLAN link L1 first, and then complete receiving the data unit DU2 via the WLAN link L2.

Figure 16:
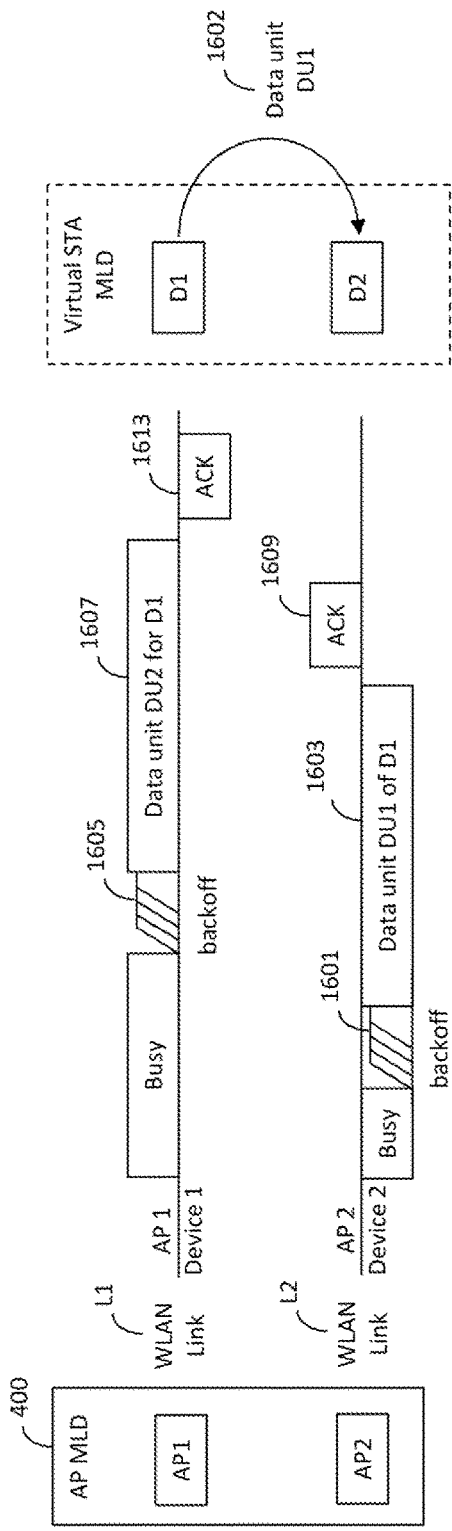
FIG. 16 illustrates a first example data transmission in STR operation.

FIG. 16 illustrates a first example data transmission in STR operation.

Operations shown in FIG. 16 may be sequentially performed but are not necessarily sequentially performed. For example, the order of the operations may be changed, or at least two operations may be performed in parallel.

Referring to FIG. 16, the AP MLD 400 may have a buffer containing data units including a data unit DU2 to be transmitted to the wireless communication device D1, the wireless communication device D1 may have a buffer containing data units including a data unit DU1 to be transmitted to the AP MLD 400, and the wireless communication device D1 and the wireless communication device D2 may form a virtual STA MLD using the WLAN link L1 and the WLAN link L2.

The wireless communication device D1 may determine which backoff counter (e.g., the backoff counter for which WLAN link) reaches 0 first. When the backoff counter for the WLAN link L2 reaches 0 first at operation 1601, the wireless communication device D1 may transmit the data unit DU1 to the wireless communication device D2 via the communication link L3 at operation 1602.

The wireless communication device D2 may begin to transmit a data frame including the data unit DU1 to the AP2 via the WLAN link L2 at operation 1603.

The AP MLD 400 may check whether the backoff counter for the WLAN link L1 reaches 0 during the AP2's reception of the data unit DU1. When the backoff counter for the WLAN link L1 reaches 0 at operation 1605 during the AP2's reception of the data unit DU1, the AP1 may begin to transmit a data frame including the data unit DU2 to the wireless communication device D1 via the WLAN link L1 at operation 1607. During operation 1607, the AP MLD 400 and the wireless communication device D1 may perform STR operation for a downlink data frame and an uplink data frame.

At operation 1609, the AP2 may begin to transmit an Ack frame for the data unit DU1 to the wireless communication device D2 via the WLAN link L2 during the AP1's transmission of the data unit DU2.

At operation 1613, the wireless communication device D1 may transmit an Ack frame for the data unit DU2 to the AP1 after the wireless communication device D1 successfully receives the data unit DU2.

In the embodiment of FIG. 16, the AP MLD 400 may complete receiving the data unit DU1 via the WLAN link L2 first, and then the wireless communication device D1 may complete receiving the data unit DU2 via the WLAN link L1.

Figure 17:
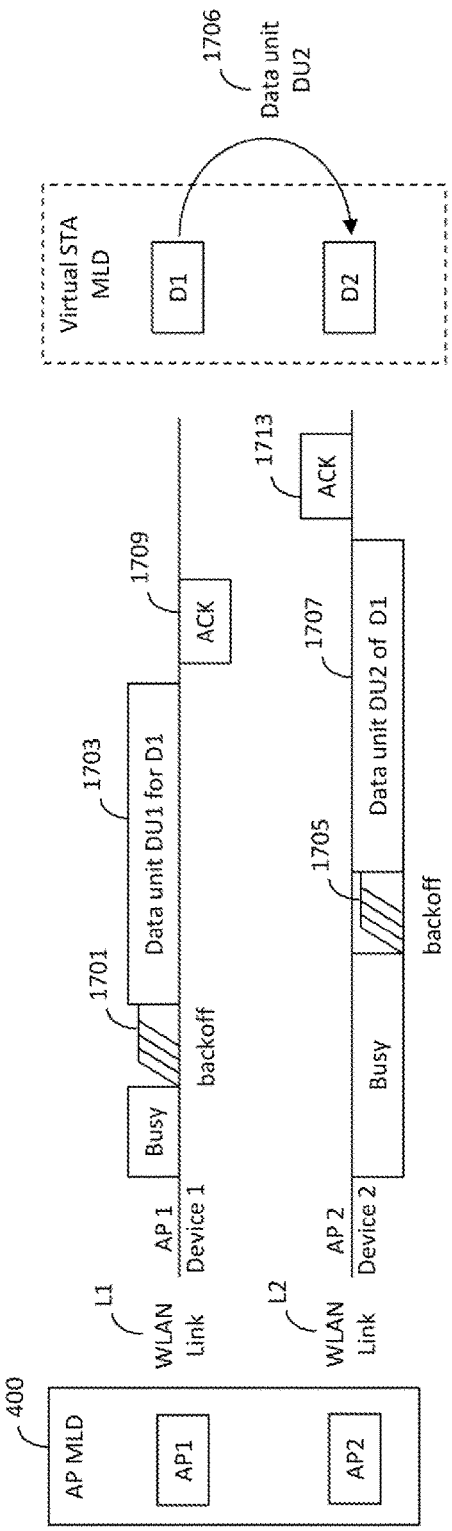
FIG. 17 illustrates a second example data transmission in STR operation.

FIG. 17 illustrates a second example data transmission in STR operation.

Operations shown in FIG. 17 may be sequentially performed but are not necessarily sequentially performed. For example, the order of the operations may be changed, or at least two operations may be performed in parallel.

Referring to FIG. 17, the AP MLD 400 may have a buffer containing data units including a data unit DU1 to be transmitted to the wireless communication device D1, the wireless communication device D1 may have a buffer containing data units including a data unit DU2 to be transmitted to the AP MLD 400, and the wireless communication device D1 and the wireless communication device D2 may form a virtual STA MLD using the WLAN link L1 and the WLAN link L2.

The AP MLD 400 may determine which backoff counter (e.g., the backoff counter for which WLAN link) reaches 0 first. When the backoff counter for the WLAN link L1 reaches 0 first at operation 1701, the AP1 may begin to transmit a data frame including the data unit DU1 to the wireless communication device D1 via the WLAN link L1 at operation 1703.

The wireless communication device D1 may check whether the backoff counter for the WLAN link L2 reaches 0 during the D1's reception of the data unit DU1. When the backoff counter for the WLAN link L2 reaches 0 at operation 1705 during the D1's reception of the data unit DU1, the wireless communication device D1 may transmit the data unit DU2 to the wireless communication device D2 via the communication link L3 at operation 1706. The wireless communication device D2 may begin to transmit a data frame including the data unit DU2 to the AP2 via the WLAN link L2 at operation 1707 during the D1's reception of the data unit DU1. During operation 1707, the AP MLD 400 and the wireless communication device D1 may perform STR operation for a downlink data frame and an uplink data frame.

At operation 1709, the wireless communication device D1 may transmit an Ack frame for the data unit DU1 to the AP1 via the WLAN Link L1 during the D2's transmission of the data unit DU2 after the wireless communication device D1 successfully receives the data unit DU1.

At operation 1713, the AP2 may begin to transmit an Ack frame for the data unit DU2 to the wireless communication device D2 via the WLAN link L2.

In the embodiment of FIG. 17, the wireless communication device D1 may complete receiving the data unit DU1 via the WLAN link L1 first, and then the AP MLD 400 may complete receiving the data unit DU2 via the WLAN link L2.

Figure 18:
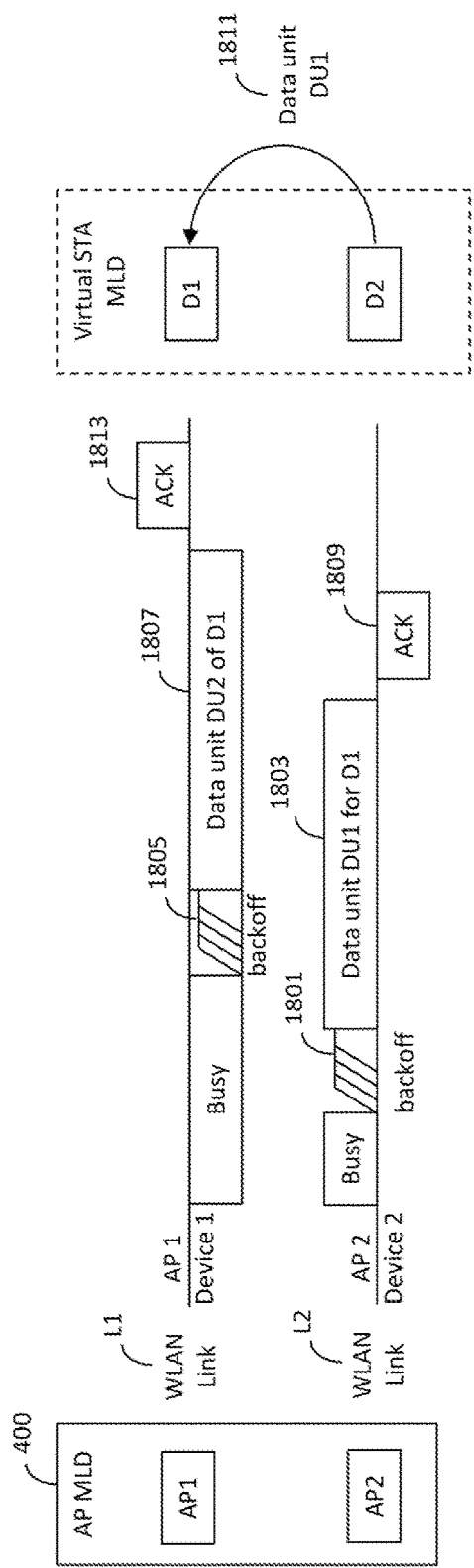
FIG. 18 illustrates a third example data transmission in STR operation.

FIG. 18 illustrates a third example data transmission in STR operation.

Operations shown in FIG. 18 may be sequentially performed but are not necessarily sequentially performed. For example, the order of the operations may be changed, or at least two operations may be performed in parallel.

Referring to FIG. 18, the AP MLD 400 may have a buffer containing data units including a data unit DU1 to be transmitted to the wireless communication device D1, the wireless communication device D1 may have a buffer containing data units including a data unit DU2 to be transmitted to the AP MLD 400, and the wireless communication device D1 and the wireless communication device D2 may form a virtual STA MLD using the WLAN link L1 and the WLAN link L2.

The AP MLD 400 may determine which backoff counter (e.g., the backoff counter for which WLAN link) reaches 0 first. When the backoff counter for the WLAN link L2 reaches 0 first at operation 1801, the AP2 may begin to transmit a data frame including the data unit DU1 to the wireless communication device D2 via the WLAN link L2 at operation 1803.

The wireless communication device D1 may check whether the backoff counter for the WLAN link L1 reaches 0 during the AP2's transmission of the data unit DU1. When the backoff counter for the WLAN link L1 reaches 0 at operation 1805 during the AP2's transmission of the data unit DU1, the wireless communication device D1 may begin to transmit a data frame including the data unit DU2 to the AP1 via the WLAN link L1 at operation 1807. During operation 1807, the AP MLD 400 and the wireless communication device D1 may perform STR operation for a downlink data frame and an uplink data frame.

At operation 1809, the wireless communication device D2 may begin to transmit an Ack frame for the data unit DU1 to the AP2 via the WLAN link L2 during the AP1's reception of the data unit DU2.

The wireless communication device D2 may transmit the data unit DU1 to the wireless communication device D1 via the communication link L3 at operation 1811.

At operation 1813, the AP1 may transmit an Ack frame for the data unit DU2 to the wireless communication device D1 after the AP1 successfully receives the data unit DU2.

In the embodiment of FIG. 18, the wireless communication device D1 may complete receiving the data unit DU1 via the WLAN link L2 first, and then the AP MLD 400 may complete receiving the data unit DU2 via the WLAN link L1.

Figure 19:
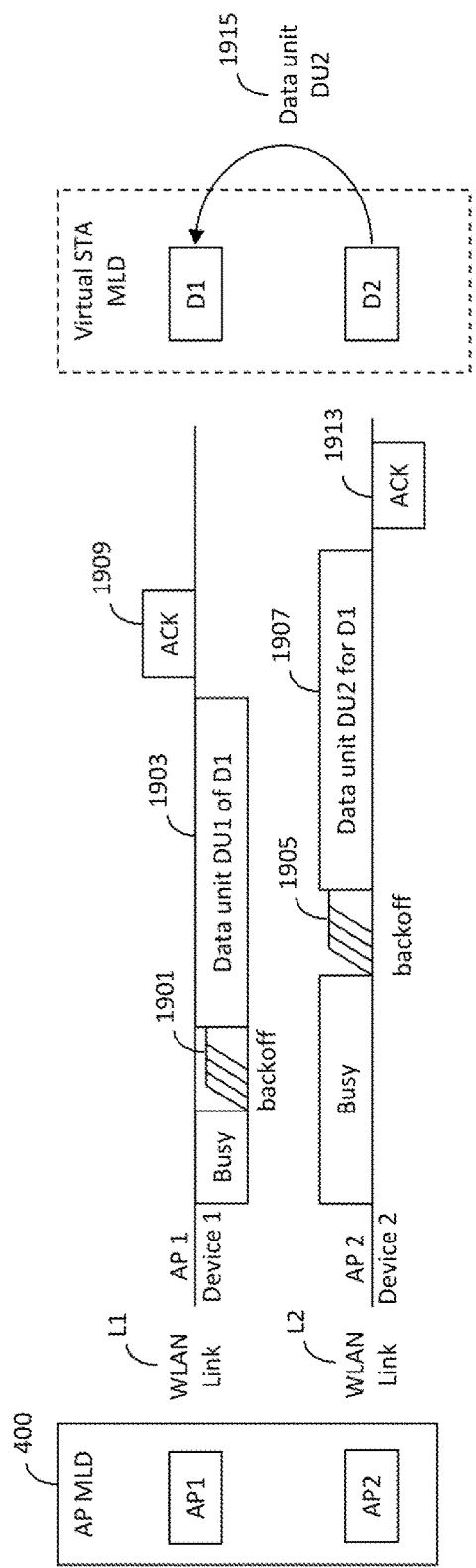
FIG. 19 illustrates a fourth example data transmission in STR operation.

FIG. 19 illustrates a fourth example data transmission in STR operation.

Operations shown in FIG. 19 may be sequentially performed but are not necessarily sequentially performed. For example, the order of the operations may be changed, or at least two operations may be performed in parallel.

Referring to FIG. 19, the AP MLD 400 may have a buffer containing data units including a data unit DU2 to be transmitted to the wireless communication device D1, the wireless communication device D1 may have a buffer containing data units including a data unit DU1 to be transmitted to the AP MLD 400, and the wireless communication device D1 and the wireless communication device D2 may form a virtual STA MLD using the WLAN link L1 and the WLAN link L2.

The wireless communication device D1 may determine which backoff counter (e.g., the backoff counter for which WLAN link) reaches 0 first. When the backoff counter for the WLAN link L1 reaches 0 first at operation 1901, the wireless communication device D1 may begin to transmit a data frame including the data unit DU1 to the AP1 via the WLAN link L1 at operation 1903.

The AP MLD 400 may check whether the backoff counter for the WLAN link L1 reaches 0 during the AP1's reception of the data unit DU1. When the backoff counter for the WLAN link L1 reaches 0 at operation 1905 during the AP1's reception of the data unit DU1, the AP2 may begin to transmit a data frame including the data unit DU2 to the wireless communication device D2 via the WLAN link L2 at operation 1907. During operation 1907, the AP MLD 400 and the wireless communication device D1 may perform STR operation for a downlink data frame and an uplink data frame.

At operation 1909, the AP1 may begin to transmit an Ack frame for the data unit DU1 to the wireless communication device D1 via the WLAN link L1 during the AP2's transmission of the data unit DU2.

At operation 1913, the wireless communication device D2 may transmit an Ack frame for the data unit DU2 to the AP2 via the WLAN link L2 after the wireless communication device D2 successfully receives the data unit DU2.

At operation 1915, the wireless communication device D2 may transmit the data unit DU2 to the wireless communication device D1 via the communication link L3.

In the embodiment of FIG. 19, the AP MLD 400 may complete receiving the data unit DU1 via the WLAN link L1 first, and then the wireless communication device D1 may complete receiving the data unit DU2 via the WLAN link L2.

Figure 20:
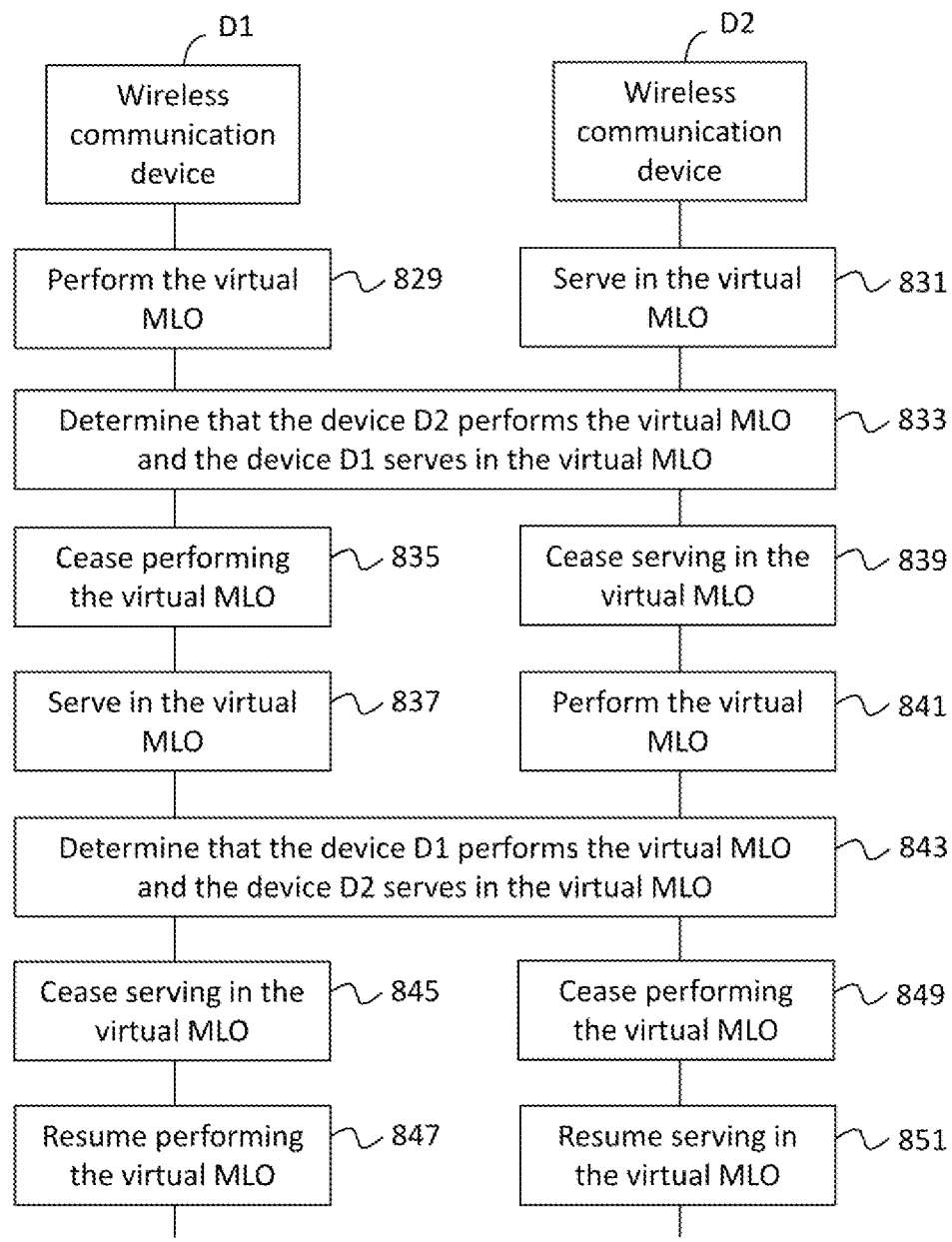
FIG. 20 illustrates an example flow chart showing role change of the MLO.

FIG. 20 illustrates an example flow chart showing role switch in the MLO.

Operations shown in FIG. 20 may be sequentially performed but are not necessarily sequentially performed. For example, the order of the operations may be changed, or at least two operations may be performed in parallel.

In particular, FIG. 20 shows the procedure following operations described with reference to FIG. 8. As described above with reference to FIG. 8, the wireless communication device D1 may perform the virtual MLO at operation 829, and the wireless communication device D2 may serve the wireless communication device D1 in the virtual MLO at operation 831.

At operation 833, the wireless communication device D1 and the wireless communication device D2 may determine to switch roles. In other words, the wireless communication device D1 and the wireless communication device D2 may determine that the wireless communication device D2 should perform the virtual MLO and the wireless communication device D1 should serve the wireless communication device D2 in the virtual MLO. In some embodiments, the wireless communication device D1 may determine the role switch in a predetermined time after the wireless communication device D1 begins to perform the virtual MLO. In some embodiments, the wireless communication device D2 may determine the role switch in a predetermined time after the wireless communication device D2 begins to serve the wireless communication device D1 in the virtual MLO. In some embodiments, the wireless communication device D2 may determine the role switch when the MLD upper MAC sublayer 613 receives a data unit through the MAC SAP 616 from an upper layer. In some embodiments, if the wireless communication device D1 determine the role switch, the wireless communication device D1 may transmit, to the wireless communication device D2, a request for such role switch, and the wireless communication device D2 may transmit a response to the wireless communication device D1. In some embodiments, if the wireless communication device D2 determine the role switch, the wireless communication device D2 may transmit, to the wireless communication device D1, a request for such role switch, and the wireless communication device D1 may transmit a response to the wireless communication device D2.

In some embodiments, the wireless communication device D1 and the wireless communication device D2 may determine that the wireless communication device D2 should perform the virtual MLO and the wireless communication device D1 should serve the wireless communication device D2 in the virtual MLO, when the wireless communication device D1 loses a user focus and the wireless communication device D2 acquires the user focus. In some embodiment, the user focus may represent that the user is using the device. In some embodiments, if the wireless communication device D1 fails to receive a user input from the user interface 230 during a predetermined time, the wireless communication device D1 may determine that the wireless communication device D1 has lost a user focus. In some embodiments, if the wireless communication device D2 receives a user input from the user interface 230, the wireless communication device D2 may determine that the wireless communication device D2 has acquired a user focus.

At operation 835, the wireless communication device D1 may cease performing the virtual MLO.

At operation 837, the wireless communication device D1 may begin serving the wireless communication device D2 in the virtual MLO by using the WLAN link L1.

At operation 839, the wireless communication device D2 may cease serving the wireless communication device D1 in the virtual MLO.

At operation 841, the wireless communication device D2 may begin performing the virtual MLO.

Once the role switch is finished, the schematic block diagram of the wireless communication network may be changed as shown in FIG. 7.

Additionally, at operation 843, the wireless communication device D1 and the wireless communication device D2 determine to switch roles back. In other words, the wireless communication device D1 and the wireless communication device D2 may determine that the wireless communication device D1 should perform the virtual MLO and the wireless communication device D2 should serve the wireless communication device D1 in the virtual MLO. The wireless communication device D1 and the wireless communication device D2 may determine to switch the role back as described in embodiments of operation 833.

At operation 845, the wireless communication device D1 may cease serving the wireless communication device D2 in the virtual MLO.

At operation 847, the wireless communication device D1 may resume performing the virtual MLO.

At operation 849, the wireless communication device D2 may cease performing the virtual MLO.

At operation 851, the wireless communication device D2 may resume serving the wireless communication device D1 in the virtual MLO.

Once the role switch is finished, the schematic block diagram of the wireless communication network may be changed as shown in FIG. 6.

FIG. 21 illustrates an electronic device 2101 in a network environment 2100 according to an embodiment.

Referring to FIG. 21, the electronic device 2101 in the network environment 2100 may communicate with an electronic device 2102 via a first network 2198 (e.g., a short-range wireless communication network), or an electronic device 2104 or a server 2108 via a second network 2199 (e.g., a long-range wireless communication network). According to an embodiment, the electronic device 2101 may communicate with the electronic device 2104 via the server 2108. According to an embodiment, the electronic device 2101 may include a processor 2120, memory 2130, an input module 2150, a sound output module 2155, a display module 2160, an audio module 2170, a sensor module 2176, an interface 2177, a connecting terminal 2178, a haptic module 2179, a camera module 2180, a power management module 2188, a battery 2189, a communication module 2190, a subscriber identification module (SIM) 2196, or an antenna module 2197. In some embodiments, at least one of the components (e.g., the connecting terminal 2178) may be omitted from the electronic device 2101, or one or more other components may be added in the electronic device 2101. In some embodiments, some of the components (e.g., the sensor module 2176, the camera module 180, or the antenna module 2197) may be implemented as a single component (e.g., the display module 2160).

The processor 2120 may execute, for example, software (e.g., a program 2140) to control at least one other component (e.g., a hardware or software component) of the electronic device 2101 coupled with the processor 2120, and may perform various data processing or computation. According to one embodiment, as at least part of the data processing or computation, the processor 2120 may store a command or data received from another component (e.g., the sensor module 2176 or the communication module 2190) in volatile memory 2132, process the command or the data stored in the volatile memory 2132, and store resulting data in non-volatile memory 2134. According to an embodiment, the processor 2120 may include a main processor 2121 (e.g., a central processing unit (CPU) or an application processor), or an auxiliary processor 2123 (e.g., a graphics processing unit (GPU), a neural processing unit (NPU), an image signal processor (ISP), a sensor hub processor, or a communication processor (CP)) that is operable independently from, or in conjunction with, the main processor 2121. For example, when the electronic device 2101 includes the main processor 2121 and the auxiliary processor 2123, the auxiliary processor 2123 may be adapted to consume less power than the main processor 2121, or to be specific to a specified function. The auxiliary processor 2123 may be implemented as separate from, or as part of the main processor 2121.

The auxiliary processor 2123 may control at least some of functions or states related to at least one component (e.g., the display module 2160, the sensor module 2176, or the communication module 2190) among the components of the electronic device 2101, instead of the main processor 2121 while the main processor 2121 is in an inactive (e.g., sleep) state, or together with the main processor 2121 while the main processor 2121 is in an active state (e.g., executing an application). According to an embodiment, the auxiliary processor 2123 (e.g., an ISP or a CP) may be implemented as part of another component (e.g., the camera module 2180 or the communication module 2190) functionally related to the auxiliary processor 2123. According to an embodiment, the auxiliary processor 2123 (e.g., the NPU) may include a hardware structure specified for artificial intelligence model processing. An artificial intelligence model may be generated by machine learning. Such learning may be performed, e.g., by the electronic device 2101 where the artificial intelligence is performed or via a separate server (e.g., the server 2108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2130 may store various data used by at least one component (e.g., the processor 2120 or the sensor module 2176) of the electronic device 2101. The various data may include, for example, software (e.g., the program 2140) and input data or output data for a command related thereto. The memory 2130 may include the volatile memory 2132 or the non-volatile memory 2134.

The program 2140 may be stored in the memory 2130 as software, and may include, for example, an operating system (OS) 2142, middleware 2144, or an application 2146.

The input module 2150 may receive a command or data to be used by another component (e.g., the processor 2120) of the electronic device 2101, from the outside (e.g., a user) of the electronic device 2101. The input module 2150 may include, for example, a microphone, a mouse, a keyboard, a key (e.g., a button), or a digital pen (e.g., a stylus pen).

The sound output module 2155 may output sound signals to the outside of the electronic device 2101. The sound output module 2155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2160 may visually provide information to the outside (e.g., a user) of the electronic device 2101. The display module 2160 may include, for example, a display, a hologram device, or a projector and control circuitry to control a corresponding one of the display, hologram device, and projector. According to an embodiment, the display module 2160 may include a touch sensor adapted to detect a touch, or a pressure sensor adapted to measure the intensity of force incurred by the touch.

The audio module 2170 may convert a sound into an electrical signal and vice versa. According to an embodiment, the audio module 2170 may obtain the sound via the input module 2150, or output the sound via the sound output module 2155 or a headphone of an external electronic device (e.g., an electronic device 2102) directly (e.g., wiredly) or wirelessly coupled with the electronic device 2101.

The sensor module 2176 may detect an operational state (e.g., power or temperature) of the electronic device 2101 or an environmental state (e.g., a state of a user) external to the electronic device 2101, and then generate an electrical signal or data value corresponding to the detected state. According to an embodiment, the sensor module 2176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2177 may support one or more specified protocols to be used for the electronic device 2101 to be coupled with the external electronic device (e.g., the electronic device 2102) directly (e.g., wiredly) or wirelessly. According to an embodiment, the interface 2177 may include, for example, a high definition multimedia interface (HDMI), a universal serial bus (USB) interface, a secure digital (SD) card interface, or an audio interface.

A connecting terminal 2178 may include a connector via which the electronic device 2101 may be physically connected with the external electronic device (e.g., the electronic device 2102). According to an embodiment, the connecting terminal 2178 may include, for example, an HDMI connector, a USB connector, an SD card connector, or an audio connector (e.g., a headphone connector).

The haptic module 2179 may convert an electrical signal into a mechanical stimulus (e.g., a vibration or a movement) or electrical stimulus which may be recognized by a user via his tactile sensation or kinesthetic sensation. According to an embodiment, the haptic module 2179 may include, for example, a motor, a piezoelectric element, or an electric stimulator.

The camera module 2180 may capture a still image or moving images. According to an embodiment, the camera module 2180 may include one or more lenses, image sensors, ISPs, or flashes.

The power management module 2188 may manage power supplied to the electronic device 2101. According to one embodiment, the power management module 2188 may be implemented as at least part of, for example, a power management integrated circuit (PMIC).

The battery 2189 may supply power to at least one component of the electronic device 2101. According to an embodiment, the battery 2189 may include, for example, a primary cell which is not rechargeable, a secondary cell which is rechargeable, or a fuel cell.

The communication module 2190 may support establishing a direct (e.g., wired) communication channel or a wireless communication channel between the electronic device 2101 and the external electronic device (e.g., the electronic device 2102, the electronic device 2104, or the server 2108) and performing communication via the established communication channel. The communication module 2190 may include one or more CPs that are operable independently from the processor 2120 (e.g., the application processor) and supports a direct (e.g., wired) communication or a wireless communication. According to an embodiment, the communication module 2190 may include a wireless communication module 2192 (e.g., a cellular communication module, a short-range wireless communication module, or a global navigation satellite system (GNSS) communication module) or a wired communication module 2194 (e.g., a local area network (LAN) communication module or a power line communication (PLC) module). A corresponding one of these communication modules may communicate with the external electronic device via the first network 2198 (e.g., a short-range communication network, such as Bluetooth™, Wi-Fi direct, or IR data association (IrDA)) or the second network 2199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2192 may identify and authenticate the electronic device 2101 in a communication network, such as the first network 2198 or the second network 2199, using subscriber information (e.g., international mobile subscriber identity (IMSI)) stored in the SIM 2196.

The wireless communication module 2192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2192 may support a high-frequency band (e.g., the mmWave band) to achieve, e.g., a high data transmission rate. The wireless communication module 2192 may support various technologies for securing performance on a high-frequency band, such as, e.g., beamforming, massive multiple-input and multiple-output (MIMO), full dimensional MIMO (FD-MIMO), array antenna, analog beamforming, or large scale antenna. The wireless communication module 2192 may support various requirements specified in the electronic device 2101, an external electronic device (e.g., the electronic device 2104), or a network system (e.g., the second network 2199). According to an embodiment, the wireless communication module 2192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2197 may transmit or receive a signal or power to or from the outside (e.g., the external electronic device) of the electronic device 2101. According to an embodiment, the antenna module 2197 may include an antenna including a radiating element composed of a conductive material or a conductive pattern formed in or on a substrate (e.g., a printed circuit board (PCB)). According to an embodiment, the antenna module 2197 may include a plurality of antennas (e.g., array antennas). In such a case, at least one antenna appropriate for a communication scheme used in the communication network, such as the first network 2198 or the second network 2199, may be selected, for example, by the communication module 2190 (e.g., the wireless communication module 2192) from the plurality of antennas. The signal or the power may then be transmitted or received between the communication module 2190 and the external electronic device via the selected at least one antenna. According to an embodiment, another component (e.g., a radio frequency integrated circuit (RFIC)) other than the radiating element may be additionally formed as part of the antenna module 2197.

According to various embodiments, the antenna module 2197 may form a mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2101 and the external electronic device 2104 via the server 2108 coupled with the second network 2199. Each of the electronic devices 2102 or 2104 may be a device of a same type as, or a different type, from the electronic device 2101. According to an embodiment, all or some of operations to be executed at the electronic device 2101 may be executed at one or more of the external electronic devices 2102, 2104, or 2108. For example, if the electronic device 2101 should perform a function or a service automatically, or in response to a request from a user or another device, the electronic device 2101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2101. The electronic device 2101 may provide the outcome, with or without further processing of the outcome, as at least part of a reply to the request. To that end, a cloud computing, distributed computing, mobile edge computing (MEC), or client-server computing technology may be used, for example. The electronic device 2101 may provide ultra low-latency services using, e.g., distributed computing or MEC. In another embodiment, the external electronic device 2104 may include an Internet-of-things (IoT) device. The server 2108 may be an intelligent server using machine learning and/or a neural network. According to an embodiment, the external electronic device 2104 or the server 2108 may be included in the second network 2199. The electronic device 2101 may be applied to intelligent services (e.g., smart home, smart city, smart car, or healthcare) based on 5G communication technology or IoT-related technology.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

One aspect of the present disclosure provides an electronic device for facilitating wireless communication. The electronic device may comprise a memory and a processor coupled to the memory. The electronic device is configured to cause transmitting a request frame for a virtual multiple link operation between the external electronic device and the electronic device to an external electronic device, receiving a response frame from the external electronic device in response to the request frame, set up a first wireless link between the external electronic device and the electronic device, and setting up a virtual link between the external electronic device and the electronic device. The virtual link includes a second wireless link between the external electronic device and another electronic device and a communication link between the another electronic device and the electronic device. The electronic device is further configured to cause communicating with the external electronic device via the first wireless link and the virtual link.

In some embodiment, the request frame may include a first medium access control (MAC) address of the electronic device and a second MAC address of the another electronic device.

In some embodiment, the request frame may further include a multi-link device (MLD) MAC address of the electronic device.

In some embodiment, the request frame may further include information on capabilities that are supported by the another electronic device for the second wireless link.

In some embodiment, the electronic device may further be configured to cause receiving the second MAC address and the information on capabilities from the another electronic device.

In some embodiment, a first frame may be allowed to be transmitted from the electronic device to the external electronic device via one of the first wireless link and the virtual link simultaneously while a second frame is transmitted from the external electronic device to the electronic device via another of the first wireless link and the virtual link.

In some embodiment, the electronic device may be further configured to cause receiving, from the another electronic device via the communication link, a data unit that is received from the external electronic device via the second wireless link.

In some embodiment, the electronic device may be further configured to cause transmitting, to the another electronic device via the communication link, a data unit that is to be transmitted to the external electronic device via the second wireless link.

In some embodiment, the electronic device may be further configured to cause determining to serve the another electronic device, ceasing communicating with the external electronic device via the first wireless link and the virtual link, and serving the another electronic device using the first wireless link in another virtual multiple link operation between the external electronic device and the another electronic device. The another virtual multiple link operation uses another virtual link between the external electronic device and the another electronic device and the second wireless link between the external electronic device and the another electronic device. The another virtual link includes the first wireless link between the external electronic device and the electronic device and the communication link between the electronic device and the another electronic device.

In some embodiment, the electronic device may be further configured to cause determining to resume communicating with the external electronic device via the first wireless link and the virtual link, ceasing serving the another electronic device, and resuming communicating with the external electronic device via the first wireless link and the virtual link.

In some embodiment, the electronic device may be further configured to cause determining to serve the another electronic device when the electronic device fails to receive a user input during a predetermined time and the another electronic device receives a user input.

In some embodiment, the request frame may be a probe request frame or an association request frame, and the response frame is a probe response frame or an association response frame.

In some embodiment, the communication link may have higher throughput than the first wireless link and the communication link may have higher throughput than the second wireless link.

In some embodiment, the another electronic device may have a battery for charging the electronic device.

In some embodiment, the external electronic device may include a first access point (AP) station and a second AP station. The electronic device includes a first non-AP station. The another electronic device includes a second non-AP station. The first wireless link is set up between the first AP station and the first non-AP station. The second wireless link is set up between the second AP station and the second non-AP station.

Another aspect of the present disclosure provides an electronic device for facilitating wireless communication. The electronic device may comprise a memory and a processor coupled to the memory. The electronic device is configured to cause receiving a request frame for a virtual multiple link operation between the another electronic device and an external electronic device from another electronic device, transmitting a response frame to the another electronic device in response to the request frame, setting up a first wireless link between the external electronic device and the electronic device, and serving the another electronic device using the first wireless link in the virtual multiple link operation. The virtual multiple link operation uses a virtual link between the external electronic device and the another electronic device and a second wireless link between the external electronic device and the another electronic device. The virtual link includes the first wireless link between the external electronic device and the electronic device and a communication link between the electronic device and the another electronic device.

In some embodiment, the response frame may include a medium access control (MAC) address of the electronic device.

In some embodiment, the electronic device may be further configured to cause, when a data unit for the another electronic device is received from the external electronic device via the first wireless link, transmitting the data unit to the another electronic device via the communication link.

In some embodiment, the electronic device may be further configured to cause, when a data unit is received from the another electronic device via the communication link, transmitting the data unit to the external electronic device via the first wireless link.

Another aspect of the present disclosure provides an electronic device for facilitating wireless communication. The electronic device may comprise a memory and a processor coupled to the memory. The electronic device is configured to cause receiving, from an external electronic device, a request frame for a virtual multiple link operation between the electronic device and the non-electronic device, transmitting a response frame to the external electronic device in response to the request frame, setting up a first wireless link between the electronic device and the external electronic device, setting up a virtual link between the electronic device and the external electronic device, and communicating with the external electronic device via the first wireless link and the virtual link. The virtual link includes a second wireless link between the electronic device and another external electronic device and a communication link between the another external electronic device and the external electronic device.

What is claimed is:

1. An electronic device, the electronic device comprising:
a processor; and
a memory storing instructions which, when executed by the processor, cause the electronic device to:
transmitting, to an external electronic device, a request frame for a virtual multiple link operation between the external electronic device and the electronic device;
receiving a response frame from the external electronic device in response to the request frame;
setting up a first wireless link between the external electronic device and the electronic device;
setting up a virtual link between the external electronic device and the electronic device, the virtual link including a second wireless link between the external electronic device and another electronic device and a communication link between the another electronic device and the electronic device; and
communicating with the external electronic device via the first wireless link and the virtual link.

2. The electronic device of claim 1, wherein the request frame includes a first medium access control (MAC) address of the electronic device and a second MAC address of the another electronic device.

3. The electronic device of claim 2, wherein the request frame further includes a multi-link device (MLD) MAC address of the electronic device.

4. The electronic device of claim 3, wherein the request frame further includes information on capabilities that are supported by the another electronic device for the second wireless link.

5. The electronic device of claim 4, wherein the electronic device is further configured to cause:
receiving the second MAC address and the information on capabilities from the another electronic device.

6. The electronic device of claim 1, wherein a first frame is allowed to be transmitted from the electronic device to the external electronic device via one of the first wireless link and the virtual link simultaneously while a second frame is transmitted from the external electronic device to the electronic device via another of the first wireless link and the virtual link.

7. The electronic device of claim 1, wherein communicating with the external electronic device comprises:

receiving, from the another electronic device via the communication link, a data unit that is received from the external electronic device via the second wireless link.

8. The electronic device of claim 1, wherein communicating with the external electronic device comprises:
transmitting, to the another electronic device via the communication link, a data unit that is to be transmitted to the external electronic device via the second wireless link.

9. The electronic device of claim 1, wherein the electronic device is further configured to cause:
determining to serve the another electronic device;
ceasing communicating with the external electronic device via the first wireless link and the virtual link; and
serving the another electronic device using the first wireless link in another virtual multiple link operation between the external electronic device and the another electronic device, the another virtual multiple link operation using another virtual link between the external electronic device and the another electronic device and the second wireless link between the external electronic device and the another electronic device, and the another virtual link including the first wireless link between the external electronic device and the electronic device and the communication link between the electronic device and the another electronic device.

10. The electronic device of claim 9, wherein the electronic device is further configured to cause:
determining to resume communicating with the external electronic device via the first wireless link and the virtual link;
ceasing serving the another electronic device; and
resuming communicating with the external electronic device via the first wireless link and the virtual link.

11. The electronic device of claim 9, wherein determining to serve the another electronic device comprises:
determining to serve the another electronic device when the electronic device fails to receive a user input during a predetermined time and the another electronic device receives a user input.

12. The electronic device of claim 1, wherein the request frame is a probe request frame or an association request frame, and the response frame is a probe response frame or an association response frame.

13. The electronic device of claim 1, wherein the communication link has higher throughput than the first wireless link and the communication link has higher throughput than the second wireless link.

14. The electronic device of claim 1, wherein the another electronic device has a battery for charging the non-AP device.

15. The electronic device of claim 1, wherein the external electronic device includes a first access point (AP) station and a second AP station,
the electronic device includes a first non-AP station,
the another electronic device includes a second non-AP station,
the first wireless link is set up between the first AP station and the first non-AP station, and
the second wireless link is set up between the second AP station and the second non-AP station.

16. An electronic device, the electronic device comprising:
a processor; and
a memory storing instructions which, when executed by the processor, cause the electronic device to:
receiving, from another electronic device, a request frame for a virtual multiple link operation between the another electronic device and an external electronic device;
transmitting a response frame to the another electronic device in response to the request frame;
setting up a first wireless link between the external electronic device and the electronic device; and
serving the another electronic device using the first wireless link in the virtual multiple link operation, the virtual multiple link operation using a virtual link between the external electronic device and the another electronic device and a second wireless link between the external electronic device and the another electronic device, the virtual link including the first wireless link between the external electronic device and the electronic device and a communication link between the electronic device and the another electronic device.

17. The electronic device of claim 16, wherein the response frame includes a medium access control (MAC) address of the electronic device.

18. The electronic device of claim 16, wherein the electronic device is further configured to cause:
when a data unit for the another electronic device is received from the external electronic device via the first wireless link, transmitting the data unit to the another electronic device via the communication link.

19. The electronic device of claim 16, wherein the electronic device is further configured to cause:
when a data unit is received from the another electronic device via the communication link, transmitting the data unit to the external electronic device via the first wireless link.

20. An electronic device, the electronic device comprising:
a processor; and
a memory storing instructions which, when executed by the processor, cause the electronic device to:
receiving, from an external electronic device, a request frame for a virtual multiple link operation between the electronic device and the external electronic device;
transmitting a response frame to the external electronic device in response to the request frame;
setting up a first wireless link between the electronic device and the external electronic device;
setting up a virtual link between the electronic device and the external electronic device, the virtual link including a second wireless link between the electronic device and another external electronic device and a communication link between the another external electronic device and the external electronic device; and
communicating with the external electronic device via the first wireless link and the virtual link.

* * * * *